(12) United States Patent
Tanaka et al.

(10) Patent No.: US 6,384,168 B1
(45) Date of Patent: May 7, 2002

(54) SURFACE ACTIVE AGENT CONTAINING FLUORINE AND COATING COMPOSITIONS USING THE SAME

(75) Inventors: Kazunori Tanaka; Kiyofumi Takano, both of Izumiotsu; Torao Higuchi; Yutaka Hashimoto, both of Sakai, all of (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/699,689

(22) Filed: Oct. 31, 2000

Related U.S. Application Data

(62) Division of application No. 09/024,564, filed on Feb. 17, 1998, now Pat. No. 6,156,860.

(30) Foreign Application Priority Data

Feb. 18, 1997 (JP) ............................................. 9-033717
May 13, 1997 (JP) ............................................. 9-122145
Jan. 28, 1998 (JP) ........................................... 10-015407

(51) Int. Cl.$^7$ ............................................ C08F 120/22
(52) U.S. Cl. ....................... 526/245; 524/544; 524/545; 524/546; 526/250
(58) Field of Search .................................. 526/245, 250; 524/544, 545, 546

(56) References Cited

U.S. PATENT DOCUMENTS 5,023,305 A   6/1991   Onozuka et al.
5,068,295 A   11/1991  Misaizu et al.

*Primary Examiner*—Bernard Lipman
(74) *Attorney, Agent, or Firm*—Armstrong, Westerman & Hattori, LLP

(57) ABSTRACT

The invention provides a surface active agent containing fluorine, which is a copolymer composed of several ethylenic unsaturated monomers containing a fluorinated alkyl group, a silicone chain, and a polyoxyalkylene group, and the surface loss energy of which is less than $110 \times 10^{-5}$ mJ in an organic solvent. The copolymer of the surface active agent is soluble to water and in various organic solvents, and has a good compatibility with other ingredients used to form the coating compositions. The present surface active agent reduces the dynamic surface tension of the coating composition, and thereby, have a good foam-preventing property, coating compositions containing the present surface active agent yield coated films with uniform and smooth level surfaces without forming irregularity and striation even by coating operations at high speed and high shearing force.

5 Claims, No Drawings

US 6,384,168 B1

SURFACE ACTIVE AGENT CONTAINING FLUORINE AND COATING COMPOSITIONS USING THE SAME

This application is a division of prior application Ser. No. 09/024,564 filed Feb. 17, 1998, now U.S. Pat. No. 6,156,860.

BACKGROUND OF THE INVENTION

1. Field of the Invention

The present invention relates to a surface active agent and coating compositions containing the same to be used in the field of coating paints or laminates with high uniformity and high surface smoothness by a spray coating, and in the field of coating a thin coat of a photo-resist containing a photo-sensitizer by a spin-coating for the production of semiconductor devices, such as ICs, LSIs, liquid crystal display devices, and thermal heads.

2. Background Art

Conventionally, various surface active agents, called leveling agents, in chemical compositions of hydrocarbon, silicone, and fluorine are used in the field of coating in order to improve the uniformity and smoothness of the coated layers. Among various surface active agents, fluorine surface active agents are widely used due to their high capability in reducing the surface tension of the coating composition and in coating without leaving contamination after coating.

However, in a high speed coating or in a coating operation under high shearing force such as a spin coating or a spray coating, the coating composition containing a surface active agent which is capable to reduce only the static surface energy (the definition will be given hereinafter) does not necessarily produce sufficient leveling of the coated layer, causing pin-holes, craters, and fish-eyes on the coat surface, which result in deteriorating the product values. Typical examples of such high load coatings are the spray coating of a paint or the spin coating of a photo-resist on a silicon substrate in the manufacturing process of semiconductor devices. In the spray coating, the liquid paint is converted into droplets at the moment when the paint leaves the spray nozzle, which results in a drastic increase of the surface area. If these droplets of paint do not contain sufficient surface active agent at the time when droplets are formed, the resin particles which are the main component of the paint are exposed on the droplet surface during coating, which results in poor leveling of the coated film by causing craters, pin-holes, and fish-eyes at the film surface. The conventional leveling agent used in the spin-coating tends to cause an uneven surface finish called "striation" which is a fatal defect in the field of micro-machining.

A few surface active agents and the coating compositions containing these surface active agents are disclosed in Japanese Patent Application, First Publication, No. Hei-3-30825, and Japanese Patent Application, First Publication, No. Hei-8-62834. These documents disclose that these surface active agents are effective to some extent, but it is not clear how these agents are used in practical coating operations.

Conventionally, it is known that there is a relationship between the leveling of a coated layer and the surface tension of the coating composition. However, it is observed that a dynamic surface tension of a coating composition is an important factor to determine the leveling of a coated layer when the coating is carried out at high speed and under high shearing force.

The surface tension of a pure liquid reaches an equilibrium value within a period of less than 0.05 sec or presumably within $10^{-9}$ seconds, after a new surface is formed. However, the surface tension of a water solution or a solution containing a surface active agent decreases gradually after a new surface is formed and reaches a constant value after several hours or even after even a few days. This type of changing surface tension is defined as the "dynamic surface tension", while constant surface tension is defined as the "static surface tension". The surface tension is an important factor in operations of emulsification, dispersion, foaming, wetting, and rinsing, and, conventionally, merely the static surface tension of the solution was measured to prepare for these operations. However, it is clear that the above surface phenomena are related to dynamic surface tension as reported by Sasaki in "Surface", vol.17, No.2, p.138 (1979). Further, it was shown that the effect of the dynamic surface tension should be negated in order to eliminate surface defects of a coating layer, as disclosed by G. P. Bierwagen in Prog. Org. Coatings, No. 3, p. 101(1975).

Therefore, the object of the present invention is to provide a surface active agent containing fluorine and coating compositions using the same, which offer excellent leveling of a coated layer and the coated film by drastically reducing dynamic surface tension, even when the coating is performed under high load coating operations at a high speed and under a high shearing force.

SUMMARY OF THE INVENTION

Accordingly, it is an object of the present invention to provide a surface active agent having specified characteristics which are not obtained by conventional hydrocarbons, silicones, and fluorinated compounds, and to provide coating compositions containing the surface active agent of the present invention, which exhibit high leveling of the coated layer even by coating operations at high speed or under high shearing force.

The inventors have found that when a surface active agent, which is composed of fluorinated compounds and in which the surface loss energy in an organic solvent is less than $110 \times 10^{-5}$ mJ, or in which the surface loss energy in water, or in a mixture of water and an organic solvent, is less than $7,000 \times 10^{-5}$ mJ, is introduced to a coating composition, the surface active agent gives the coating composition an excellent leveling capability even in coating operations at high speed or under high shearing force.

The scope of the present invention is classified into the following categories, which are:

(I) a surface active agent, composed of a compound having at least a fluorinated alkyl group in the molecule, and the surface loss energy of the surface active agent dissolved in an organic solvent is less than $110 \times 10^{-5}$ mJ;

(II) a surface active agent recited in (I) which is composed of a copolymer of an ethylenic unsaturated monomer having a fluorinated alkyl group and an ethylenic unsaturated monomer having a silicone chain;

(III) a surface active agent recited in (I) which is composed of a copolymer of an ethylenic unsaturated monomer having a fluorinated alkyl group and an ethylenic unsaturated monomer having a branching aliphatic hydrocarbon group;

(IV) a surface active agent recited in (I) which is composed of a copolymer polymerized by essential constituting units of an ethylenic unsaturated monomer containing fluorinated alkyl group and an ethylenic unsaturated monomer containing a silicone chain represented by the chemical formula (1),

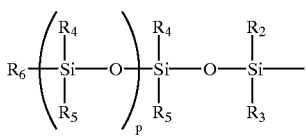

(1)

where, R2 and R3, which may be the same or different, represent an alkyl group of 1 to 20 carbon atoms or a phenyl group, or a functional group indicated by the following chemical formula (2),

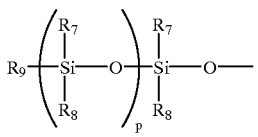

(2)

where, R7, R8, and R9, which may be the same or different, represent an alkyl group having 1–20 carbon atoms or a phenyl group, and R4, R5, and R6, which may be the same or different, represent an alkyl group having 1–20 carbon atoms or a phenyl group, and p is 0 or a integer from 1 to 3;

(V) a surface active agent recited in (IV), wherein R2 and R3 of the formula (1) are the functional group shown in the formula (2);

(VI) a surface active agent recited in (V), wherein R4, R5, and R6 in the formula (1) and R7, R8, and R9 in the formula (2) are methyl groups, and p is 0;

(VII) a surface agent recited in (IV), wherein the copolymer further comprises a structural unit of an ethylenic unsaturated monomer having polyoxyalkylene group;

(VIII) a surface active agent composed of a copolymer polymerized with essential structural units of an ethylenic unsaturated monomer having a fluorinated alkyl group and an ethylenic unsaturated monomer having a branching aliphatic hydrocarbon group containing at least a tertiary carbon atom or a quaternary carbon atom;

(IX) a surface active agent recited in (VIII), wherein the total number of carbon atoms in a branching aliphatic hydrocarbon group is more than 4;

(X) a surface active agent recited in (VIII), wherein the branching aliphatic hydrocarbon group contains more than 2 of tertiary or quaternary carbon atoms;

(XI) a surface active agent recited in (IX), wherein the branching aliphatic hydrocarbon group is represented by the following formula (3);

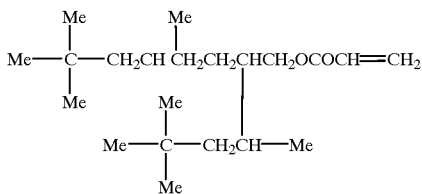

(3)

(XII) a surface active agent recited in (VIII) wherein the copolymer comprises a structural unit of an ethylenic unsaturated monomer having at least one polyoxyalkylene group;

(XIII) a coating composition comprising the surface active agent recited in (I);

(XIV) a coating composition comprising the surface active agent recited in (VI); and (XV) a coating composition comprising the surface active agent recited in (VIII).

DESCRIPTION OF THE PREFERRED EMBODIMENTS

First, the relationship between the surface loss energy and the dynamic surface tension will be described hereinafter. The surface loss energy is the value representing the dynamic surface tension. In general, when a surface active agent is dissolved in a solvent, the surface active agent forms a surface absorption layer on the surface of the solution. When the surface area of the absorption layer is increased or reduced, the surface tension of the solution shifts from its equilibrium. When the surface area of the solution is changed, the absorption layer deforms, but at the same time, the deformation is partially compensated by the movement of the solute as well as the restoration of the absorbed material from the compressed area to the extended area (Sasaki in "Surface" vol.17, No.2, p.138, 1979).

The present invention has an object to provide a surface active agent and the coating composition containing thereof to be applicable to high speed or to high load coating operations. Therefore, it is important to understand the behavior of the absorption layer caused by the change of the surface area. When the surface area of the solution is reduced, the deformation of the surface absorption layer is rapidly recovered by the inward movement of the surface active agent. Whereas when the surface area of the solution is extended, molecules of the surface active agent move slowly to form a new absorption layer. This molecular behavior of the surface active agent during the change of the surface area produces a hysteresis in a coordinate between the surface tension and the surface area due to the rapid and delayed restoration of the absorption layer while the surface area is reducing or extending, respectively. The inside area surrounded by both curves during reducing and extending surface area is a product of the surface tension and the surface area, and the product is called the "surface loss energy".

The surface loss energy is represented as a product of the surface tension ($\gamma$) and the surface area (A). In more detail, the surface loss energy can be obtained by measuring surface tensions at time points during extension and contraction of the surface area. The surface loss energy (E") is obtained by calculating the following equation, $$E''=\Sigma(\gamma(ex)\cdot A(ex))-\Sigma(\gamma(sh)\cdot A(sh))$$

where, $\gamma(ex)$ and $\gamma(sh)$ represent surface tensions measured at respective time points during extending and reducing the surface area, respectively, and A(ex) and A(sh) are surface areas at respective time points during extending and reducing the surface area, respectively.

If the surface loss energy of the surface active agent is less than $110\times10^{-5}$ mJ, when dissolved in an organic solvent, and if the surface energy is less than $7,000\times10^{-5}$ mJ when dissolved in a mixture of water and an organic solvent, the coating composition containing such surface agent will not yield a coat with a good leveling property due to the occurrence of pin-holes or striations, especially when the coating is carried out at high speed and under high shearing force such as spin-coating.

In the case when the surface active agent of the present invention is used in an organic solvent, any organic solvent may be used without limitation. Examples of organic solvents are, for example, alcohols such as ethanol, iospropyl-alcohol, n-butanol, iso-butanol, and tert-butanol; ketones such as acetone, methylethyl ketone, ethylisopropyl ketone, methylamylketone; esters such as methyl acetate, ethyl acetate, butyl acetate, methyl lactate, ethyl lactate, and butyl lactate; monocarboxylic acids such as methyl-2-oxypropionate, ethyl-2-oxypropionate, propyl-2-oxypropionate, butyl-2-oxypropionate, methyl-2-methoxypropionate, ethyl-2-methoxypropionate, propyl-2-methoxypropionate, and butyl-2-methoxypropionate; polar solvents such as dimethylformamide, dimethysulfoxyd, and N-methylpyrrolidone; ethers such as methylcellosolve, cellosolve, butylcellosolve, butylcarbitol, ethylcellosolve acetate; propyleneglycols and their esters such as propyleneglycol, propyleneglycol-monomethylether, propyleneglycol-monomethylether acetate, propyleneglycolmonoethylether acetate, propyleneglycol-monobutylether acetate; halogen solvents such as 1,1,1-trichloroethane and chloroform; ethers of tetrahydrofuran and dioxanes; aromatic solvents such as benzene, toluene, and xylene; and fluorinated inert liquids such as perfluoro octane and perfluorotri-n-butylamine.

It is to be understood that the present invention is not limited to these examples.

The fluorine-containing compound of this invention may be dissolved in water or in any mixture of water and known organic solvents so that the present compound can be used by dissolving in a solvent suitable for the application.

The phrase "a mixture of water and an organic solvent" used in this specification indicates a mixture which contains more than 0.5% by weight of water to the total weight of the mixture.

There is no limitation to the structure of the fluorinated alkyl group in the compound of this invention and any compound may be introduced in the coating composition, if the compound, when introduced in the coating composition, is provided with necessary characteristics, such as a controlled dynamic surface tension, compatibility with the solvent and the matrix resin in the coating composition, and foamability. The foamability in this specification indicates the ability of the surface active agent to expel gaseous inclusions from the coating composition so as not to leave bubbles in the coated layer or the coated film.

It is preferable to adopt a perfluoroalkyl group of 1 to 20 carbon atoms, as the fluorinated alkyl group, all of hydrogen atoms in which are replaced with fluorine atoms. The perfluoroalkyl group of 1 to 14 carbon atoms is more preferable, and the perfluoroalkyl group of 3 to 10 carbon atoms is the most preferable. There is no limitation to the structure of the perfluoroalkyl groups, no matter how the perfluoroalkyl group is constituted, by a linear chain, a branching chain, or even when the main chain of the group is intervened by an oxygen atom.

Examples of the surface active agents containing such fluorinated alkyl groups are listed below.

$C_8F_{17}SO_3K$
$C_5F_{17}SO_3H$
$C_{10}F_{21}SO_3H$
$C_8F_{17}SO_2N(CH_3)CH_2COONa$
$C_6F_{13}SO_2N(C_3H_7)CH_2COOK$
$C_8F_{17}SO_2NHCH_2CH_2OCOCH_2COOK$
$C_8F_{17}SO_2NHCH_2CH_2CH_2N(CH_3)_3Cl$
$C_6F_{17}SO_2NHCH_2CH_2CH_2N(CH_3)_3(C_2H_5)_2SO_4$
$C_6F_{13}SO_2NHCH_2CH_2CH_2N(CH_3)_3(CH_2CH_5)_2SO_3K$
$C_8F_{17}SO_2N(C_8H_7)CH_2CH_2OPO(OH)_2$

It is to be understood that the present invention is not limited to these examples.

The fluorinated alkyl group of this invention is an essential functional group for reducing the surface loss energy of the coating composition in various solvent systems, and for providing the coating composition with the high leveling property of a coated film even when the coated film is formed at high speed and under high shearing force. When the fluorinated alkyl group is not present in the compound, the coating composition containing the compound may not form a coat with a uniform and smooth finish with the high leveling property.

In order to control the surface loss energy of solutions of a coating composition in various solvent systems into the above described range, it is preferable to synthesize the fluorinated alkyl group containing a compound as the surface active agent by telomerization or by oligomerization. Examples of the surface active agent with the fluorinated group synthesized by telomerization or oligomerization are as follows.

$C_7F_{15}CH_2CH_2COOH$
$C_8F_{17}CH_2CH_2COOK$
$C_8F_{17}CH_2CH_2COONH_4$
$C_8F_{17}CH_2CH_2COOCH_3$
$C_6F_{13}CH_2CH_2OH$
$C_8F_{17}CH_2CH_2OH$
$C_8F_{17}CH_2CH_2OCOCH_2CH_2COOK$
$C_6F_{13}GH_2CH_2OCOCH_2CH_2COONH_4$
$C_8F_{18}CH_2CH_2OPO(OH)_2$
$C_8F_{17}CH_2CH_2OPO(OH)_2$
$C_8F_{17}CH_2CH_2SO_3H$
$C_8F_{17}CH_2CH_2SO_3K$
$C_8F_{17}CH_2CH_2SO_3Na$

It is to be understood that the present invention is not limited to these examples.

Further, in order to control the surface loss energy of the coating compositions of various solvent systems into the desired range, it is preferable to add a polyoxyalkylene group together with the fluorinated alkyl group to the compound for the surface active agent. Although there is no particular limitation to the polyoxyalkylene group, and any polyoxyalkylene group may be adopted, if it is compatible with the matrix resin and the solvent of the coating composition, it is preferable to apply an ethylene oxide group and/or a propylene oxide group, and the degree of polymerization of the compound is preferably in a range between 1–50, and more preferably in a range of 5–30. Examples of the preferable compounds with the polyoxyalkylene group follow.

$C_6F_{13}SO_2N(C_3H_7)(CH_2CH_2O)_3H$
$C_8F_{17}SO_2N(C_3H_7)(CH_2CH_2O)_{10CH}3$
$C_8F_{17}SO_2N(C_3H_7)(CH_2CH_2O)_{10}H$
$C_8F_{17}SO_2N(C_3H_7)(CH_2CH_2O)_{20}H$
$C_4F_9SO_2N(CH)(CH_2CH_2O)_5H$
$C_6F_{13}SO_2N(C_3H_7)(CH_2CH_2O)_{15}COCH_2CH_2COONa$
$C_8F_{17}SO_2NH(CH_2CH_2O)_{10}(CH(CH_3)CH_2O)_{20}(CH_2CH_2O)_{10}H$
$C_8F_{17}SO2NHCH2CH2O(CH(CH_3)CH_2O)_{20}H$
$C_8F_{17}(CH_2CH_2O)_{20}H$
$C_8F_{17}(CH_2CH_2O)_5H$
$C_8F_{17}(CH_2CH_2O)_8CH_3$
$C_{12}F_{25}(CH_2CH_2O)_{30}CH_3$
$C_8F_{17}(CH_2CH_2O)_5COCH_2CH_2COOK$

It is to be understood that the present invention is not limited to these examples.

In turn, a practical coating composition is composed of many coating ingredients to be coated as well as at least one solvent. As indicated in the previous section, when a leveling agent is incorporated in the coating composition, in order to improve the leveling property of the coated film formed under very severe conditions by the addition of the leveling agent, that is, the surface active agent, the surface active agent in the coating composition is required to be compatible with the other materials in the composition. It is to be noted that even if the leveling property is improved by the addition of leveling agent or the surface active agent, foamability sometimes deteriorates the efficiency of the coating operation.

Coating ingredients in the coating composition include the matrix resin, the solvent, and other additives in the coating composition.

In the case when a surface active agent is designed to provide both compatibility and foamability, it is preferable that the fluorine-containing surface active agent be in the form of a polymer.

Any polymerization method can be applied in order to introduce the essential structural group of the fluorinated alkyl group into the polymer. Synthesis of a fluorine-containing polymer by the introduction of the fluorinated alkyl group in the polymer can be performed by various methods, for example, treatment of a pre-synthesized polymer without containing fluorine under plasma; reaction of a pre-synthesized polymer without containing fluorine and having a first reactive group with a compound having a fluorinated alkyl group and a functional group which is reactive to the first reactive group; polymerization of the ethylenic unsaturated monomer having a fluorinated alkyl group; polymerization using an initiator or a chain transfer agent having fluorinated alkyl group; and combinations of these methods. The inventors found that it is preferable to select the method of the polymerization of the ethylenic unsaturated monomer having a fluorinated alkyl group from the points of view of compatibility of both high leveling property and deformability, and manufacturing cost.

Any ethylenic unsaturated monomer may be used if the monomer includes the ethylenic unsaturated group as well as the fluorinated alkyl group in the molecule. It was found that the most suitable monomer is that having acrylester or similar groups from the points of view of an availability of raw material, compatibility with ingredients in the coating composition, control of the compatibility, and reactivity in the polymerization process. An example of the monomer is (meth)acrylate as shown in the following chemical formula (3).

Here, the (meth)acrylate in the present specification generically denotes methacrylate, acrylate, fluoroacrylate, and chlorinated acrylates.

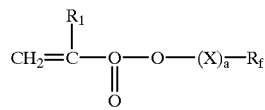

(4)

Wherein, $R_f$ represents perfluoroalkyl group or partially fluorinated alkyl group, having a linear chain, a branching chain, or the main chain of which may include oxygen atoms in the main chain, for example, $(OCF_2CF_2)_2CF(CF_3)_2$, and $R_1$ represents H, $CH_3$, Cl, or F, and X represents bivalent linkage groups, such as

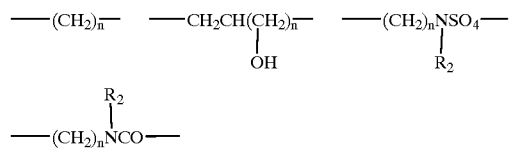

where, n is a integer from 1 to 10, $R_2$ represents a hydrogen, an alkyl group with 1–6 carbon atoms. Examples of the alkyl group are shown below.

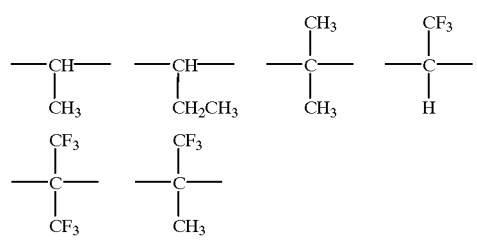

where a represents 0 or 1.

The (meth)acrylate further includes compounds having a plurality of perfluoro-alkyl groups represented by the following general chemical formula (5).

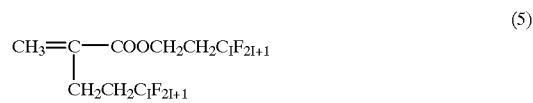

(5)

In order to provide a polymer containing a fluorinated alkyl group with a capability of reducing the dynamic surface tension in the coated composition, it is preferable to introduce the fluorinated alkyl group by telomerization or oligomerization. The preferable compounds obtained by these polymerization processes are expressed by the chemical Formula (4) or in the chemical formula (5), in which, X in the chemical formula (4) comprises bivalent linkage groups represented below.

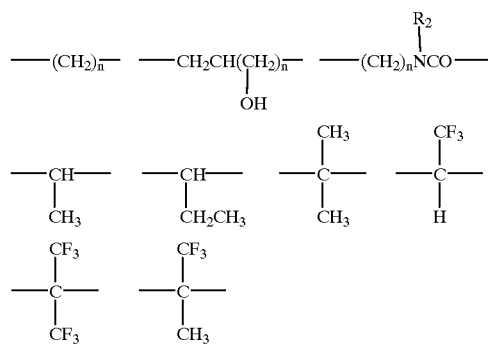

wherein, n is 0 or 1.

Examples of preferable (meth)acrylate compounds containing fluorinated alkyl groups are shown in following pages.

$CH_2=CHCOOCH_2CH_2C_8F_{17}$ a-1

$CH_2=\underset{\underset{CH_3}{|}}{C}COOCH_2CH_2C_8F_{17}$ a-2

$CH_2=CHCOOCH_2CH_2C_{12}F_{25}$ a-3

$CH_2=\underset{\underset{CH_3}{|}}{C}COOCH_2CH_2C_{12}F_{25}$ a-4

$CH_2=CHCOOCH_2CH_2C_{10}F_{21}$ a-5

$CH_2=\underset{\underset{CH_3}{|}}{C}COOCH_2CH_2C_{10}F_{21}$ a-6

$CH_2=CHCOOCH_2CH_2C_6F_{13}$ a-7

$CH_2=\underset{\underset{CH_3}{|}}{C}COOCH_2CH_2C_6F_{13}$ a-8

$CH_2=CHCOOCH_2CH_2C_4F_9$ a-9

$CH_2=\underset{\underset{F}{|}}{C}COOCH_2CH_2C_6F_{13}$ a-10

$CH_2=\underset{\underset{CH_3}{|}}{C}COOCH_2CH_2C_{20}F_{41}$ a-11

$CH_2=\underset{\underset{Cl}{|}}{C}COOCH_2CH_2C_4F_9$ a-12

$CH_2=\underset{\underset{CH_3}{|}}{C}COO(CH_2)_6C_{10}F_{21}$ a-13

$CH_2=\underset{\underset{CH_3}{|}}{C}COOCH_2CF_3$ a-14

$CH_2=CHCOOCH_2CF_3$ a-15

$CH_2=CHCOOCH_2C_8F_{17}$ a-16

$CH_2=\underset{\underset{CH_3}{|}}{C}COOCH_2C_8F_{17}$ a-17

$CH_2=\underset{\underset{CH_3}{|}}{C}COOCH_2C_{20}F_{41}$ a-18

$CH_2=CHCOOCH_2C_{20}F_{41}$ a-19

$CH_2=\underset{\underset{CH_3}{|}}{C}COOCH_2CF(CF_3)_2$ a-20

$CH_2=\underset{\underset{CH_3}{|}}{C}COOCH_2CFHCF_3$ a-21

-continued $CH_2=\underset{\underset{F}{|}}{C}COOCH_2C_2F_5$ a-22

$CH_2=CHCOOCH_2(CH_2)_6CF(CF_3)_2$ a-23

$CH_2=\underset{\underset{CH_3}{|}}{C}COOCHCF_2CFHCF_3$
                    $\underset{CH_3}{|}$ a-24

$CH_2=\underset{\underset{CH_3}{|}}{C}COOCHC_{10}F_{21}$
                    $\underset{C_2H_5}{|}$ a-25

$CH_2=CHCOOCH_2(CF_2)_2H$ a-26

$CH_2=\underset{\underset{CH_3}{|}}{C}COOCH_2(CF_2)_2H$ a-27

$CH_2=CHCOOCH_2(CF_2)_4H$ a-28

$CH_2=CHCOOCH_2CF_3$ a-29

$CH_2=\underset{\underset{CH_3}{|}}{C}COO(CF_2)_4H$ a-30

$CH_2=CHCOOCH_2(CF_2)_6H$ a-31

$CH_2=\underset{\underset{CH_3}{|}}{C}COOCH_2(CF_2)_6H$ a-32

$CH_2=CHCOOCH_2(CF_2)_8H$ a-33

$CH_2=\underset{\underset{CH_3}{|}}{C}COOCH_2(CF_2)_8H$ a-34

$CH_2=CHCOOCH_2(CF_2)_{10}H$ a-35

$CH_2=CHCOOCH_2(CF_2)_{12}H$ a-36

$CH_2=CHCOOCH_2(CF_2)_{14}H$ a-37

$CH_2=CHCOOCH_2(CF_2)_{18}H$ a-38

$CH_2=CHCOO\underset{\underset{CH_3}{|}}{\overset{\overset{CH_3}{|}}{C}}(CF_2)_4H$ a-39

$CH_2=CHCOOCH_2CH_2(CF_2)_7H$ a-40

$CH_2=\underset{\underset{CH_3}{|}}{C}COOCH_2CH_2(CF_2)_7H$ a-41

$CH_2=\underset{\underset{CH_3}{|}}{C}COO\underset{\underset{CH_3}{|}}{\overset{\overset{CH_3}{|}}{C}}(CF_2)_6H$ a-42 a-43
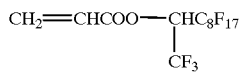

a-44

a-45

a-46
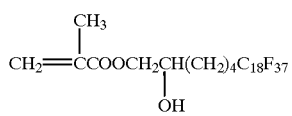

a-47

a-48

a-49
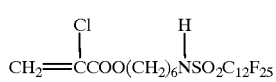

a-50

a-51

a-52
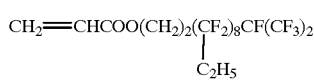

a-53

a-54

a-55

a-56
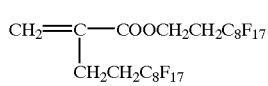

It is to be understood that the present invention is not limited to these examples.

These ethylenic unsaturated monomers containing fluorinated alkyl groups may be used alone or in combinations of two or more for polymerization.

Furthermore, it is preferable to add an ethylenic unsaturated monomer containing a silicone chain as a structural unit of the polymer. Examples of a silicone chain are represented by the following general formula (1).

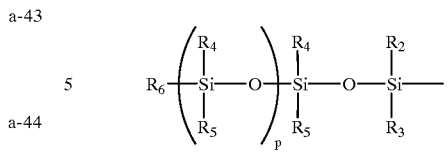
(1)

where, $R_2$ and $R_3$ represent an alkyl group or phenyl group of 1 to 20 carbon atoms or a group represented by the following chemical formula (2); $R_4$, $R_5$, and $R_6$ represents an alkyl group having 1 to 20 carbon atoms or a phenyl group.

$$\left(\begin{array}{c} R_7 \\ | \\ R_9 - Si - O \\ | \\ R_8 \end{array}\right)_p \begin{array}{c} R_7 \\ | \\ Si - O - \\ | \\ R_8 \end{array} \tag{2}$$

where, $R_7$, $R_8$, and $R_9$ represents an alkyl group of 1 to 20 carbon atoms or a phenyl group.

Among these monomers, although there is no particular limitation in selecting a monomer for polymerization from a group of these monomers, it is preferable to select an acryl ester group or the like as the ethylenic unsaturated group, in order to provide coating compositions according to the availability of the raw material, compatibility with other constituents, and control of the compatibility. Examples of preferable monomers with a silicone chain are shown by the following chemical formula (5).

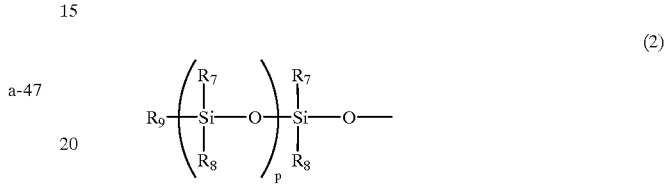
(5)

where, $R_1$ is Cl, F, or $CH_3$, $R_2$, $R_3$, $R_4$, $R_5$, $R_6$, $R_7$, $R_8$, $R_9$ are the same as the above elements, and X is a bivalent linkage group selected from the group consisting of —$CH_2CH(OH)CH_2OCO$—, —$(CH_2)NHCH_2CH(OH)CH_2OCO$—, —$(CH_2)_nOCO$—, —$(CH_2)_n$—O—$(CH_2)_m$OCO—, —$OCH_2CH(OH)CH_2OCO$—, and —$(CH_2)_nC(CF_3)_2OCO$—where, p is an integer of 0 to 3, m and n are a integer of 2 to 6, and q is 0 or 1.

Examples of such ethylenic unsaturated monomer containing the silicone chain are listed in following pages.

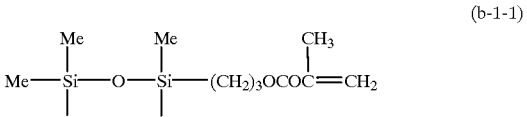
(b-1-1)

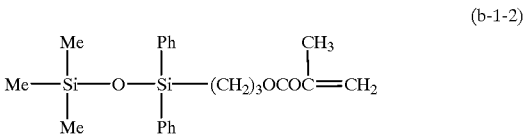
(b-1-2)

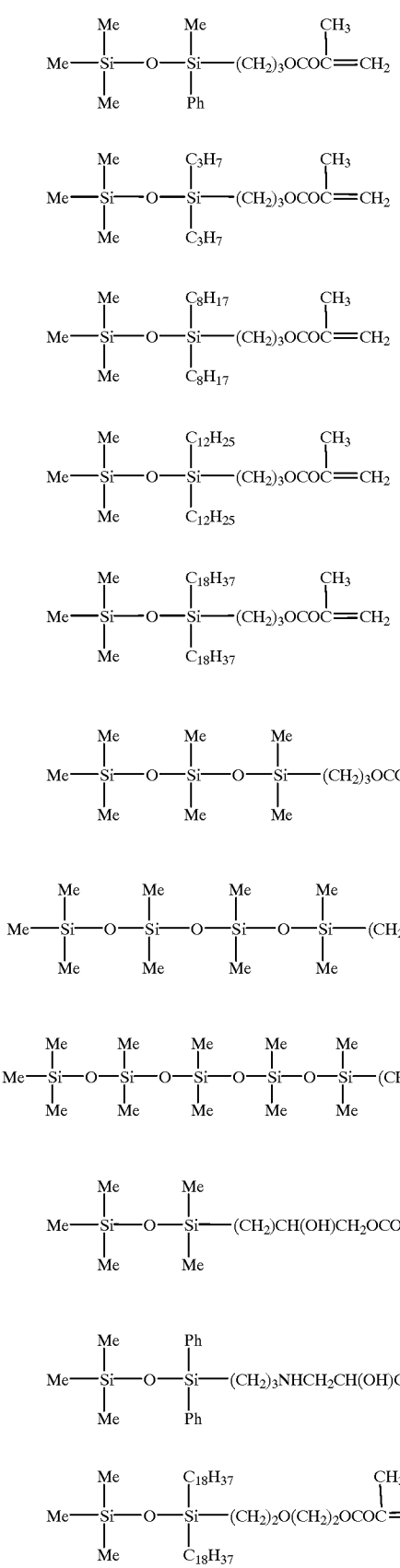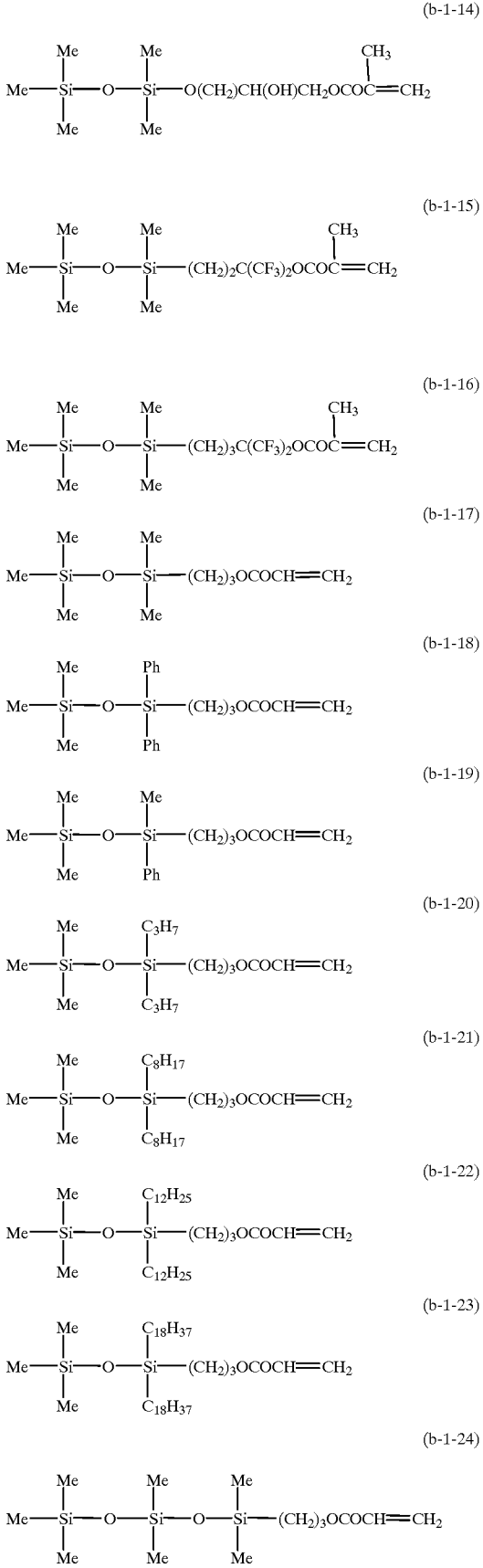

-continued
(b-1-25)
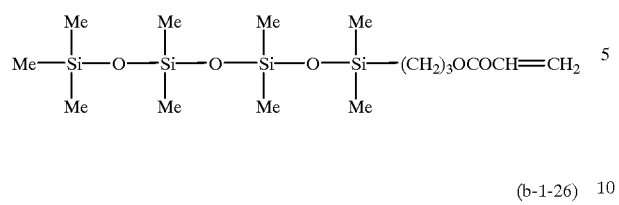
(b-1-26)
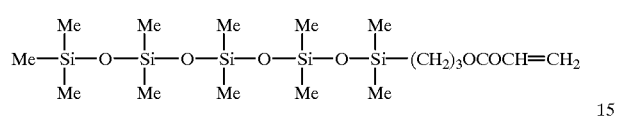
(b-1-27)
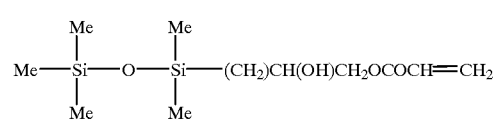
(b-1-28)
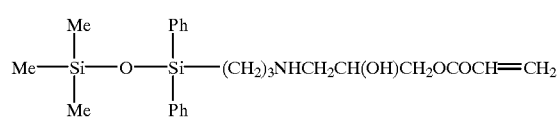
(b-1-29)
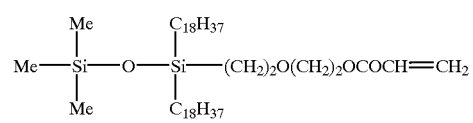
(b-1-30)
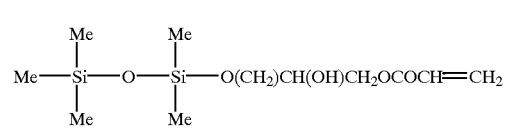
(b-1-31)
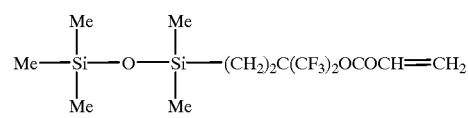
(b-1-32)
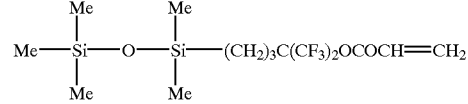
(b-2-1)
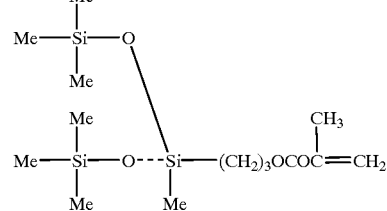
-continued
(b-2-2)
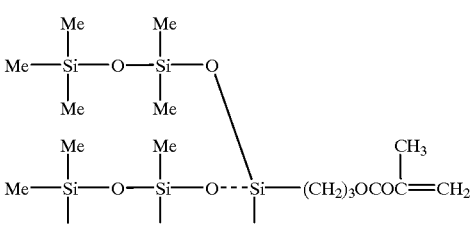
(b-2-3)
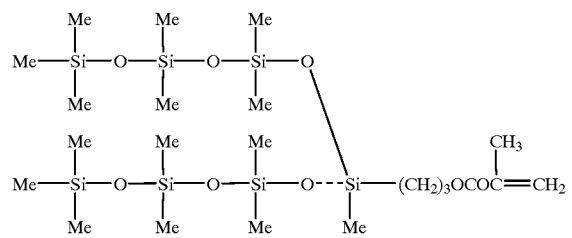
(b-2-4)
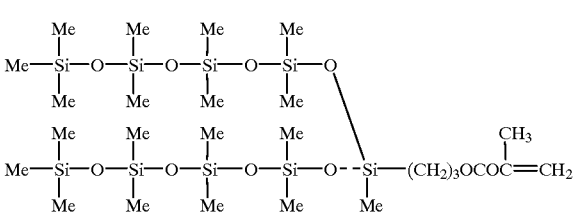
(b-2-5)
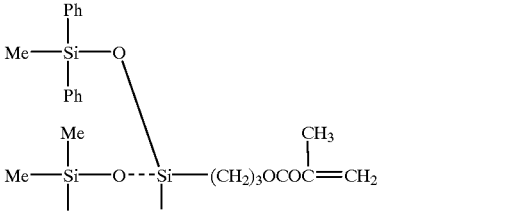
(b-2-6)
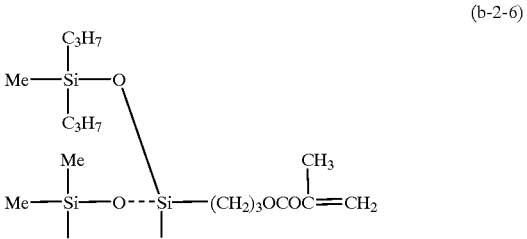
(b-2-7)
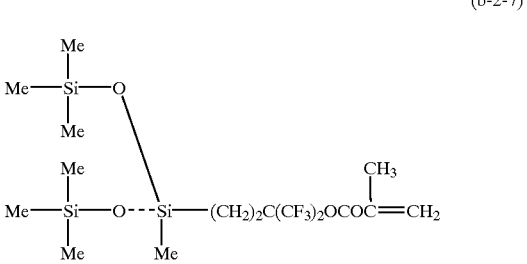

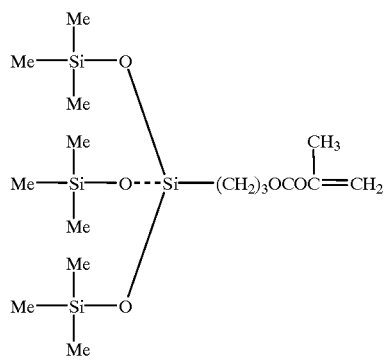
(b-3-1)

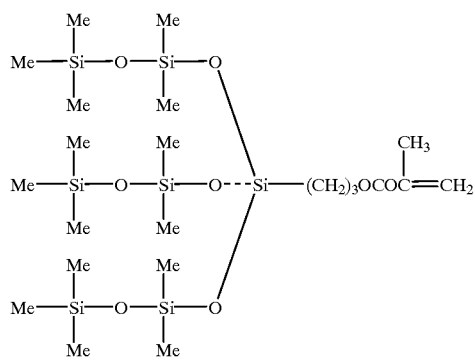
(b-3-2)

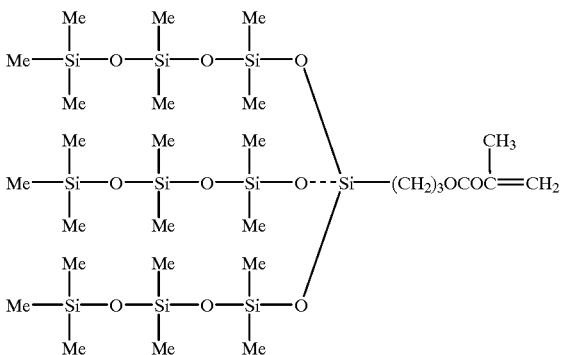
(b-3-3)

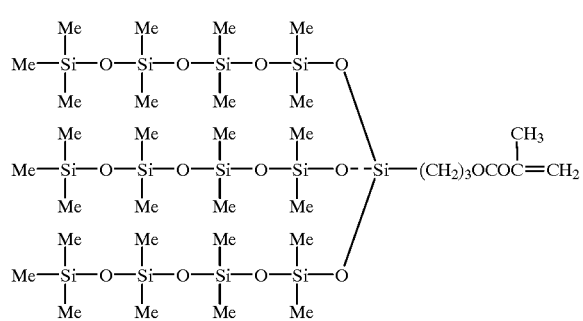
(b-3-4)

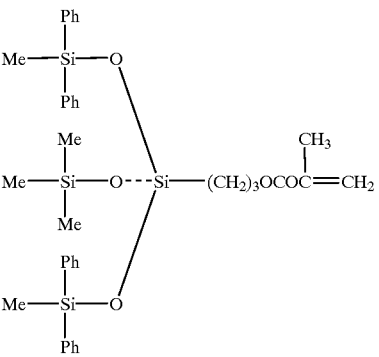
(b-3-5)

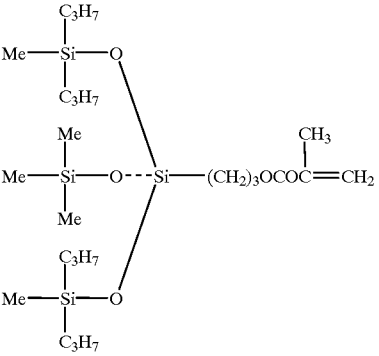
(b-3-6)

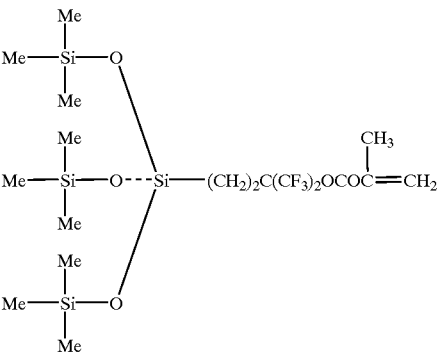
(b-3-7)

where Me represents a methyl group and Ph represents a phenyl group.

It is to be understood that the present invention is not limited to these examples.

These monomers may be used alone or in combinations of two or more. The polymer including the ethylenic unsaturated monomer containing a silicone chain not only improves the working efficiency of the coating operation by suppressing foamability, but also, in a manner similar to the ethylenic unsaturated monomer containing the fluorinated alkyl group, improves the leveling property of the coated film on the substrate surface and contributes to the formation of a uniform and smooth coated surface, even when coating is carried out at high speed and under high shearing force. Experimental results indicate that, from the point of view of improving the leveling property and contributing to the formation of a uniform and smooth coated surface, it is preferable to select a monomer containing a silicone chain, in which, $R_2$ and $R_3$ of the chemical formula (1) are substituted by branching silicone chains shown by the chemical formula (2).

In general, the coated film surface formed by a coating composition including a polymer containing a silicone chain exhibits an improved water repellency than that formed by the composition without containing silicone chain. However, the improved water repellency often degrades recoatability of coated films because good water repellency degrades wettability of a water solution applied in an after-treatment, for example, a development process of a photographic image.

In the copolymer of this invention, it is possible to add an ethylenic unsaturated monomer having a polyoxyalkylene group in order to provide a compatibility with other constituents of the coating composition as well as to provide recoating ability or ability of after-treatment to coated films.

The above compound may be used as the ethylenic unsaturated compound having the polyoxyalkylene group.

The ethylenic unsaturated monomer may be used alone or in combinations with two or more.

For improving wettability of the coat, the present inventors found that it is preferable to use a polymer containing a short silicone chain with, for example, p of less than 3. If the composition containing silicone chain with p of greater than 4, then too great water repellency is given to the coated film. When p of the silicone chain is less than 3 (most preferably p is 0) good recoatability is obtained without obstructing foamability and the leveling property. It is preferable to select a monomer containing a silicone chain, when the silicone chain has a structure in which $R_2$ and $R_3$ in the chemical formula (1) are replaced with groups represented by the chemical formula (2), and $R_4$, $R_5$, and $R_6$ in the formula (1) and $R_7$, $R_8$, and $R_9$ in the formula (2) are all converted into methyl groups and p is 0.

As described above, the most preferable surface active agent is obtained by the copolymerization of the ethylenic unsaturated monomer containing a fluorinated alkyl group and the ethylenic unsaturated monomer containing a silicone chain. Such a copolymer reduces the surface loss energy without degrading the coating efficiency, and provides the coated film with an excellent leveling property and recoatability due to controlled foamability.

Furthermore, in order to provide coated films having good leveling property and recoatability, by providing the coating composition with controlled defoamability and the compatibility with other ingredients in the composition, it is more preferable to add an ethylenic unsaturated monomer containing a polyoxyalkylene group and/or an ethylenic unsaturated monomer containing two or more unsaturated bonds in its molecule.

There is no particular limitation to the above unsaturated monomer containing the polyoxyalkylene group, if the monomer contains both an alkylene group and an ethylenic unsaturated group. An appropriate monomer is selected in accordance with properties of the matrix resin or the solvent used for the coating composition. In this case, it is preferable to select a monomer containing an ethylene oxide group and/or a propylene oxide group and the polymer is polymerized into a polymerization degree from 1 to 50, more preferably from 5 to 30. As the ethylenic unsaturated group, an acrylester group or the like is appropriate from the point of view of availability of raw materials, compatibility with other constituents of the coating composition, control of the compatibility, and reactivity in the polymerization process.

Examples of polymers containing such acrylester groups are, for example, a copolymer, which has a polymerization degree of 1 to 100, of polyethyleneglycol-mono(meth) acrylester which is obtained by the copolymerization of polyethyleneglycol, polypropyleneglycol, ethylene oxide and propylene oxide (hereinafter, mono(meth)acrylatester is used as a generic name of both acrylatealkylester and methacrylatealkylester), and a copolymer, one end of which is capped with a alkyl group of 1 to 6 carbon atoms and which has a polymerization degree of 1 to 100, of polyethyleneglycol-mono(meth)acrylatester which is obtained by the copolymerization of ethylene oxide, propylene oxide. These compounds are commercially available as, NK-ester M-20G, M-40G, M-90G, M230G, AM-90G, AMP-10G, AMP-20G, and AMP-60G, which are produced by Shin Nakamura Kagaku Kogyou Co.; Brennmar-PF-90, PE-200, PE-350, PME-100, PME-200, PME-400, PME-4000, PP-1000, PP-500, PP-800, 70PEP-350B, 55PEY-800B, 50POEP-800B, NKH-5050, AP-400, and AE-350, which are produced by Nihon Yushi Co.

It is to be understood that the present invention is not limited to these examples.

These monomers containing a polyoxyalkyleneester group may be used alone or in combinations of two or more for the polymerization.

Although there is no limitation to select the ethylenic unsaturated monomer containing more than two unsaturated bonds in its molecule, it is preferable to use an ethylenic unsaturated monomer containing an acrylester group or the like from the point of view of availability of raw materials, compatibility with other constituents of the coating composition, control of the compatibility, and reactivity in the polymerization process.

Examples of the above compounds containing the acrylester are, polyalkyleneglycol-di(meth)acrylates, with a polymerization degree of 1 to 100, obtained by the copolymerization of polyethylene glycol, polypropylene glycol, ethylene oxide, and propylene oxide; polyalkylene glycol-di(meth)azcrylate ester, one end of which is capped with an alkyl group of 1 to 6 carbon atoms, and which has a polymerization degree of 1 to 100, obtained by the copolymerization photographic image. The preferable ratio is in a range of (A)/(B)/(C)/(D)=5–50/0–40/0–90/0–30, and preferably (A)/(3)/(C)/(D)=10–40/5–30/30–70/1–10, and more preferably (A)/(B)/(C)/(D)=10–25/5–20/50–70/2–7.

If the polymer for the surface active agent is composed of monomers within the above preferable range of the ratio, coating compositions and the coated films satisfy the necessary characteristics. However, if the ratio of monomers is outside of the above range, the coating composition and the coated film win lose its practical merits in defoamability, and capability of after-treatment, and a leveling property due to the decrease of the surface loss energy of the coating composition.

The copolymer of the present invention may include, besides (A), (B), (C), and (D) monomers, another ethylenic unsaturated monomer (E). The monomer (E) is introduced in order to control compatibility, reactivity in the polymerization process and to reduce the cost of the compound. Any known ethylenic unsaturated monomers may be used as the monomer (E) without limitation, for example, styrene, nuclear-substituted styrene, acrylonitril, vinyl chroride, vinyliden chloride, vinylpyridine, N-vinylpyrrolidone, vinyl sulphonic acid, aliphatic vinyls such as vinyl acetate, a group of $\alpha$-, $\beta$-ethylenic unsaturated carboxylic acids comprising monovalent or divalent carboxylic acids, such as acrylate, methacrylate, maleinic acid, fumaric acid, itaconic acid, (meth)acrylate alkylesters (hereinafter, this name is used as a generic name including both acrylate-alkylester and methacrylate-alkylester) of 1 to 18 carbon atoms, including methyl-, ethyl-, propyl-, butyl-, octal-,2-ethylhexyl-, disil-, and stearylester-acrylate; and hydroxyalkylester-acrylates of 1 to 18 carbon atoms, such as 2-hydroxyethylester, hydroxypropylester-, and hydroxybutylester-acrylate.

The monomer (E) may further include (meth)acrylates of aminoalkylester of 1 to 18 carbon atoms such as dimethylaminoethylester, diethylaminoethylester, dimethylaminopropylester; acrylates of ether acid containing alkylester of 3 to 18 carbon atoms, such as methoxyethylester, ethoxyethylester, methoxypropylester, methylcarbylester, ethylcarbylester, butylcarbylester. Examples of the monomers (E) which contain a bridging of polyethylene glycol, polypropylene glycol, and ethylen oxide and propylene oxide; 1,6-hexanedioldiacrylate; neopentylglycoldiacrylate; trimethylpropane-(meth)acrylate and its EO denaturated compounds; tetramethylmethanetetracrylate and its EO denaturated compounds; and pentaerythritoltetracrylate. These compound are commercially available as NK-Ester 1G, 2G, 3G, 4G, 9G, 14G, 23G, BG,HD, NPG, A-200, APG-200, APG-400, APG-700, A-BPE-4, and 70-1A, which are made by Shin Nakamura Kagaku Kogyo Co., and Brenmar-PDE-50, PDE-100, PDE-150, PDE-200, PDE-400, PDE-600, ADE-200, and ADE-400, which are made by Nihon Yushi Co.

It is to be understood that the present invention is not limited to these examples.

In the case when the ethylenic unsaturated monomer is introduced in a polymer and from the point of view of compatibility and controllability of the polymerization reaction, it is preferable to use polyalkyleneglycol-di(meth)acrylate with a polymerization degree of 1 to 100, which are obtained by the copolymerization of polyethylene glycol, polypropyleneglycol, polypropyleneglycol, ethylene oxide, and propylene oxide; polyalkyleneglycol-di(meth)acrylate esters which have a polymerization degree of 1 to 100 and the end of which is capped with alkyl group of 1 to 6 carbon atoms, obtained by the copolymerization of polyethyleneglycol, polypropylene glycol, and polyethylene oxide, and polypropylene oxide. These may be used alone or in combinations of two or more.

The copolymers constituting the surface active agent of the present invention are composed of an ethylenic unsaturated monomer having a fluorinated alkyl group (A), an ethylenic unsaturated monomer having a silicone chain (B), a ethylenic unsaturated monomer having a polyoxyalkylene group (C), and an ethylenic unsaturated monomer having more than two unsaturated bonds in the molecule (D). Although a ratio of these monomers to constitute the copolymers depends on the method of coating to be applied, a general ratio can be determined in order to satisfy various characteristics for the coating composition and the coated film, such as foamability, high leveling property, capability of after treatments like recoating or development of a bond comprise, for example, dicyclopentanyloxylethyl(meth)acrylate, isobornyloxylethyl(meth)acrylate, adamantyl (meth)acrylate, dimethyladamantyl(meth)acrylate, dicyclopentanyl(meth)acrylate, dicyclopentenyl(meth)acrylate and further a group of alkylvinylether with an alkyl group of 1 to 18 carbon atoms, such as methylvinylether, dodecylvinylether and the like, and a group of glycidylether of acrylic acid, such as glycidylmethacrylate, and glycidylacrylate, and various monomers are also inclded such as, a styren-macro-monomer 4,500 produced by Sertomer Co. and macro-monomers, such as AA-6 and AN-6 produced by Toa Gosei Co.

In addition, the monomers (E) may further comprise a group of monomers containing a silane coupling group, such as γ-methacryloxypropylmethoxysilane, γ-methacryloxypropyldimethoxysilane, γ-methacryloxypropyltrimethoxysilane, and vinyltrimethoxysilane, and further includes a group of monomers containing polar groups, especially, an anionic group or a hydroxy group, such as acrylic acid, methacrylic acid, 2-(meth)acryloiloxyethylsuccinate, 2-acrylamide-2-methylpropanesulfonate, patially sulfonized styrene, mono (acryloiloxyethyl)acid phosphate, 2-hydroxyethyl(meth) acrylate, and 2-hydroxypropyl(meth)acrylate.

It is to be understood that the present invention is not limited to these eaxmples.

These monomers (E) may be used alone or in combinations of two or more.

The ratio of the monomer (E) to be copolymerized with other essential monomers (A), (B), (C), and (D) is determined depending upon the required properties of the coating composition and method of coating. However, it is preferable for the ratio to be within a range of [(A)+(B)+(C)+(D)]/(E)=20/80–100/0 by weight, and more preferably within the range of 50/50–97/3 by weight and most preferably within the rage of 70/ 30–95/5 by weight. If the weight ratio of [(A)+(B)+(C)+(D)]/(E) is outside of the above range, the polymer will lose the practical merits, when used in the coating composition, by degradation in leveling property and defoamability due to the increase of the surface loss energy and also capability of recoating.

In order to control the surface loss energy of the surface active agent within the above described range, and to control foamability of the coating composition, it is preferable to introduce an ethylenic unsaturated monomer having a branching aliphatic hydrocarbon group, in addition to the ethylenic unsaturated monomer having a silicone chain.

Although there is no particular limitation to the ethylenic unsaturated monomer containing the branching aliphatic hydrocarbon group, it is preferable to select the monomer containing an acrylester group with the branching aliphatic hydrocarbon group, in order to ensure the properties of the surface active agent such as availability of raw material, compatibility in the composition, ease of control of compatibility, and the reactivity in the polymerization.

Examples of the ethylenic unsaturated monomer containing the branching aliphatic hydrocarbon group (B') are as follows.

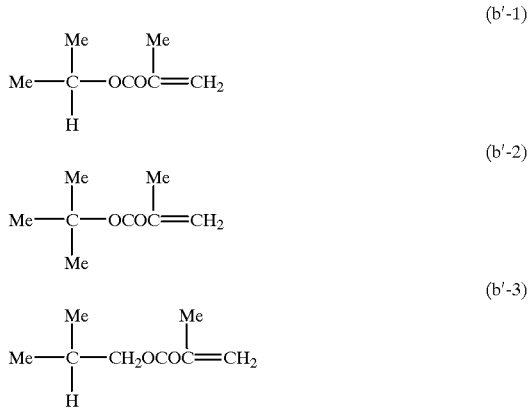

(b'-4) 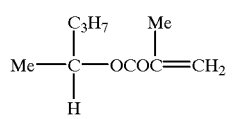
(b'-5) 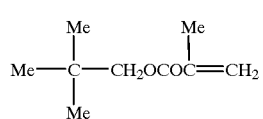
(b'-6) 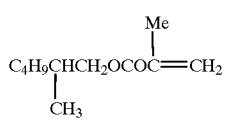
(b'-7) 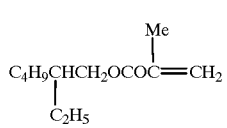
(b'-8) 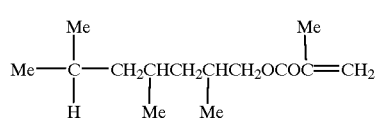
(b'-9) 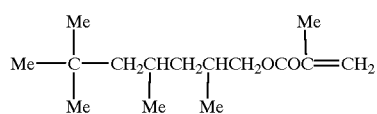
(b'-10) 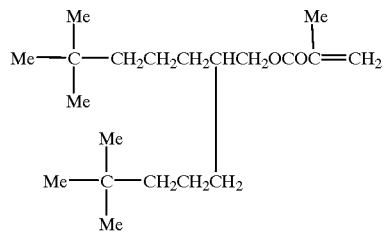
(b'-11) 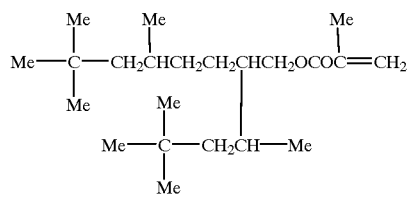
(b'-12) 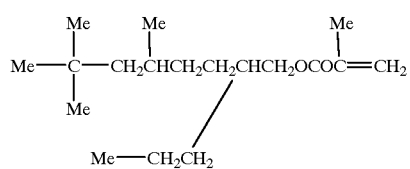
(b'-13) 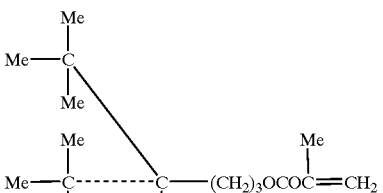
(b'-14) 
(b'-15) 
(b'-16) 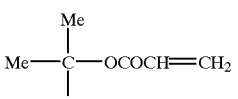
(b'-17) 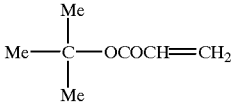
(b'-18) 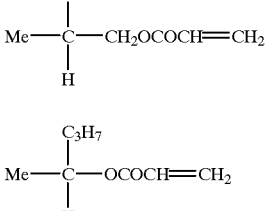
(b'-19) 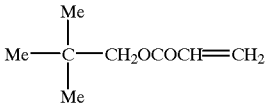
(b'-20) 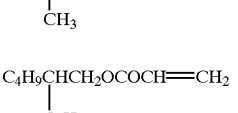
(b'-21) 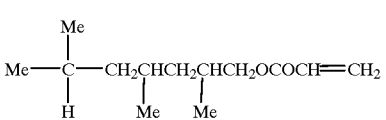
(b'-22)

-continued

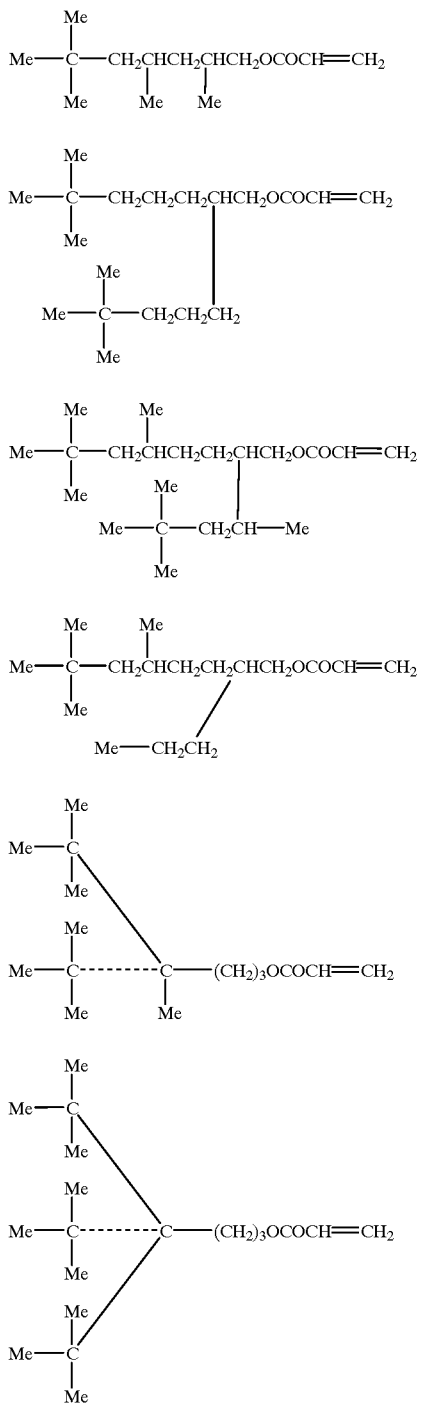

where, Me represents the methyl group.

It is to be understood that the present invention is not limited to the above examples.

These ethylenic unsaturated monomers having the branching aliphatic hydrocarbons (B') may be used alone or in combinations of two or more. The alicyclic hydrocarbon group in the monomer may include a group of the aliphatic hydrocarbon group like a cyclohexyl(meth)acrylate.

The ethylenic unsaturated monomer containing the branching aliphatic hydrocarbon group plays an important role in making the coating composition in order to improve a working efficiency of a coating operation, and to cope with coating operations at high speed coating and under a high shearing force by control of foamability of a coating composition. The branching aliphatic hydrocarbon group in the ethylenic unsaturated compounds reduces, similar to the fluorinated alkyl group, the static and dynamic surface tensions of the coating composition, and contributes to improve the leveling property of coated films and allows formation of the coated film with the uniform and smooth finish. From the point of view of reducing foamability and improving the leveling property, it is preferable that the branching aliphatic hydrocarbon group contain at least one of a tertiary carbon atom or a quaternary carbon atom, or more preferably, contains more than 2 of these carbon atoms. It is still more preferably to contain more than 4 of these tertiary or quaternary carbon atoms, and most preferably more than 8 of these carbon atoms. If less than 4 of these carbon atoms are present, then the desired leveling property and defoamability are not necessarily obtained, and desired properties including desired recoating capability are obtained only when more than 4 of these carbon atoms are contained in the group.

In general, the coated film surfaces produced by the coating composition involving a copolymer containing a linear and long aliphatic alkyl group exhibits higher water repellency than that made by the coating composition not containing that type of group. The high water repellency usually degrades the recoating efficiency due to reduction of wettability.

The inventors of this invention have found that recoating capability can be restored by introducing the copolymer containing a long but branching chain of the alkyl group. In the case when a copolymer with a n-stearylacrylate containing a linear chain of 18 carbon atoms is used to form the copolymer, the dynamic surface tension of the coating composition involving the copolymer increases and the leveling property and the recoating capability are extremely degraded due to the high water repellency. However, it was found that, if a isostearylacrylate type of the compound, of 18 carbon atoms, having a branching chain is introduced, coating compositions are provided with the controlled foamability and yield the resultant coated film with high leveling property and the recoating capability.

Therefore, the copolymer of this invention must involve both of the ethylenic unsaturated monomer having the fluorinated alkyl group and the ethylenic unsaturated monomer having isostearyl group. It is especially preferable to select the isostearyl(meth)acrylate in the chemical form shown below.

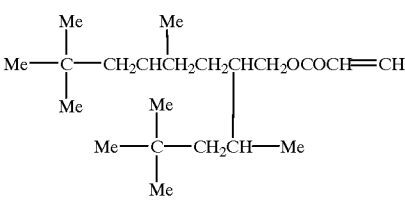

Effects of the ethylenic unsaturated monomer having the fluorinated alkyl group and the ethylenic unsaturated monomer having the branching aliphatic hydrocarbon group, which are essential constituents of the present copolymer, are not separable, and the copolymerization of both of the ethylenic unsaturated monomer having the fluorinated alkyl group and the ethylenic unsaturated monomer having the branching aliphatic hydrocarbon for introducing both the fluorinated alkyl group and the branching aliphatic hydrocarbon group into the copolymer produces the excellent properties as the surface active agent, such as high leveling property and recoatability or the ability of after-treatment of the coated film by reducing foamability and the dynamic surface tension of the coating composition.

Therefore, such excellent combinations of properties, such as compatibility of constituents and deformability of the coating composition and high leveling property and recoating ability of the coated film may not be obtained, if the copolymer lacks either one among the ethylenic unsaturated monomer having the fluorinated alkyl group or the ethylenic unsaturated monomer having the branching aliphatic hydrocarbon group.

In addition, it is preferable to add an ethylenic unsaturated monomer containing more than two unsaturated bonds in order to reduce foamability of the coating composition. The above exemplified compounds can be used as the ethylenic unsaturated monomer containing more than two unsaturated bonds. These monomers may be used alone or in combinations of two or more.

As described above, the other copolymer of the present invention comprises an ethylenic unsaturated monomer having a fluorinated alkyl group (A), an ethylenic unsaturated monomer having a branching aliphatic hydrocarbon group (B'), an ethylenic unsaturated monomer having polyoxyalkylene group (C), and anthe ethylenic unsaturated monomer including more than two unsaturated bond (D). The ratio of these monomers in the copolymer is preferably within the range of (A)/(B')/(C)/(D)=5–50/3–80/ 3–95/0–30, and more preferably within the range of (A)/(B')/(C)/(D)= 10–40/5–60/10–80/0–30, and most preferably in the range of (A)/(B')/(C)/(D)=15–25/10–40/20–60/3–8.

If the copolymer is formed by monomers in the above preferable ratio ranges, the desired properties of the coating composition and the coated films are obtained. However, if the ratio of the copolymer is outside of this range, the coated films will not exhibit desired properties, such as the leveling property, and capability of recoating, and the surface active agent will lose the practical merits.

Besides monomers,(A), (B'), (C) and (D), an ethylenic unsaturated monomer (E) may be integrated in the polymer. As the monomer (E), various ethylenic unsaturated monomers described hereinbefore may be used.

Without limitation, the present copolymers may be produced by various polymerization methods, including conventional methods such as the solution polymerization, bulk polymerization, and emulsion polymerization based on polymerization mechanisms of radical polymerization, cation polymerization, and anion polymerization. However, it is practically preferable to adopt the simple radical polymerization process for the synthesis of the present copolymer from the industrial point of view.

Conventional polymerization initiators may be used without any limitation; for example, peroxides such as benzoylperoxide, and diasyl-peroxide; azo compounds such as phenylazotriphenyl methane, azobisisobutyronitrile, metal chelate compounds like $Mn(acac)_3$, and transition-metal catalyst giving rise to the living radical polymerization. When necessary, various compounds may also be used as the initiators which includes a group of chain transfer agents such as laurylmercaptane, 2-mercaptoethanol, ethylthioglycol, octylthioglycol, and further, thiol compounds including coupling group such as γ-mercaptopropyltrimethoxysilane.

The random or block copolymers containing fluorine of the present invention are produced by a light polymerization process with the addition of sensitizer, radiation or thermal polymerization processes with addition of initiators.

Although the copolymerization may take place with or without using solvent, it is preferable to select the polymerization process according to solvent. Examples of preferable solvents are alcohols such as ethanol, isopropyl alcohol, n-butanol, iso-butanol, and tert-butanol; ketones including acetone, methylethylketone, methylisobutylketone, and methylamylketone; esters such as methyl acetate, ethyl acetate, butyl acetate, methyl lactate, ethyl lactate, butyl lactate, monocarboxylate esters such as methyl-2-oxypropionate, ethyl-2-oxypropionateethyl, propyl-2-oxypropionate, butyl-2-propionate, methyl-2-methoxypropionate, ethyl-2- methoxypropionate, propyl-2-methoxypropionate, butyl-2-methoxypropionate; polar solvents such as dimethylformaldehyde, dimethylformamide, dimethylsulfoxyd, N-methylpyrrolidone; ethers such as methylcellosolve, cellosolve, butylcellosolve, butylcarbitol, ethylcellosoveacetate, propylenegylcols and its esters such as propylenegylcol, propyleneglycol-monometherether, propyleneglycol-monomethylether acetate, and propyleneglycol-monobutylether acetate; halide solvents such as 1,1,1-trichlorethane, chloroform; ethers such as tetrahydrofuran and dioxane; aromatic solvents such as benzene, toluene, xylene, and fluorinated innert liquids such as perfluorooctane and perfluorotri-n-butylamine.

It is to be understood that the present invention is not limited to these examples.

Next, the molecular weights of the present polymers will be described hereinafter. The number average molecular weights of the present compounds reduced as polystyrene is preferably in the range of 1,000 to 200,000, and in order to provide the desirable properties of the coating composition such as compatibility with other constituents in the composition, high leveling property, elimination of foaming, and recoating capability, the number average molecular weight is preferably in the range of 1,000 to 100,000, and most preferably in the range of 2,500 to 50,000. If the number average molecular weight is less than 1,000, preferable compatibility of the polymers with other constituents in the composition is obtained, whereas, if the number average molecular weight is outside of the necessary range, desired property, such as defoamability, leveling property and ability of after-treatment are not obtained. If the number average molecular weight exceeds 200,000, the polymer may not be soluble in the coating composition.

These surface active agents containing fluorine may be used alone or in combinations of two or more in the coating composition. In addition, some other surface active agents may be added together with the present surface active agents.

The surface active agents of the present invention are applicable in the coating composition for coating at high speed and under high shearing stress due to deformability, high leveling property, recoating capability. The coating composition containing the surface active agent of the present invention provides a high leveling property of the coat surface, and, since the water repellency is controlled, after-treatment such as the recoat or development of a resist pattern can be carried out. Applications of the present coating composition extend, although are not limited to, to the fields of coating paints and photoresist resin for manufacturing electronic devices.

A conventional type of fluorine containing surface active agents was often introduced in conventional paint coating compositions in order to improve the leveling of the coat, utilizing its capability of reducing the surface tension. However, the conventional fluorine-containing surface active agent could not find wide application because the surface active agent gives the coat surface increased repellency against water and oil, which inhibits recoating of paint resin. Since the surface active agent of the present invention is provided with both capabilities of level coating and after-treatment such as recoating, it is useful to use the present surface active agent in the paint coating compositions.

The ratio of the surface active agent to be introduced in the paint coating composition changes depending upon the type of composition to paint, the method of coating, and desired properties. However, the ratio is, in general, in a range of 0.0001 to 20% by weight, and more preferably 0.001 to 10% by weight, and most preferably 0.01 to 7% by weight.

There is no particular limitation relating to the type of paint for applying the present surface active agent. The present surface active agent is applied to any type of paint, for example, a group of paints using natural resins, such as petroleum resin paint, shellac paint, rosin paint, cellulose paint, rubber paint, Japanese lacquer paint, cashew paint, and oil-vehicle paint; a group of paints using synthesized resin such as phenol-resin paint, epoxy-resin paint, vinyl-resin paint, acryl-resin paint, polyurethane-resin paint, silicone-resin paint, fluorocarbon-resin paint.

These paints may be applied in any forms of, such as water solutions, solutions in solvents, dispersed state in nonaqueous media, or powders. Examples of such solvents and dispersion mediums include alcohols, such as ethanol, isopropyl alcohol, n-butanol, and tert-butanol; ketones such as acetone, methylethylketone, and methylisobutyl ketone; esters such as methylacetate, ethylacetate, butylacetate; polar solvents such as dimethylformamide and dimethylsulfoxide; ethers such as methyl cellosolve, cellosolve, and butylcarbitol; halogen solvents such as 1,1,1-trichlorethane and chloroform; ethers such as tetrahydrofuran and dioxane; aromatic solvents such as benzene, toluene, and xylene; and fluorinated inert liquids such as perfluorooctane and perfluorotri-n-butylamine.

It is to be understood that the present invention is not limited to these examples.

When necessary, these paints may include various agents, for example, coloring agents such as pigments, dyes, and carbon blacks; inorganic powders such as silica, titanium oxide, zinc oxide, aluminum oxide, zirconium oxide, calcium oxide, and calcium carbonate; organic powders such as higher fatty acid, polyfluorinated vinylidene, polytetrafluoroethylene, and polyethylene; and other agents such as light proofing agents, weatherproofing agents, heat resistant agents, anti oxidants, thickeners, and anti-precipitation agent.

Furthermore, these paints may be coated by any conventional method without limitation by means of, for example, a roll-coater, an electrostatic coater, bar coater, gravier coating, knife coater, dip method, and spray method.

Hereinafter, a description will be given regarding the photoresist coating operation. In the photolithography process for the fabrication of semiconductor devices, the photoresist layer is generally formed on a silicon substrate at a thickness of 1 to 2 $\mu$m by spin coating of the photoresist composition, which is a coating performed under high shearing force. If the photoresist layer is not uniformly formed and the surface irregularity which is called striation is formed, it will be difficult to form photoresist patterns in a desired precision. In order to cope with the recent requirements to refine resist patterns for higher integration of elements in devices, the precise coating of the photoresist pattern is one of the important problems to be solved. Furthermore, since the size of the silicon substrate has increased from 6 inches to 8 inches or more, and the size of liquid-crystal display becomes larger, demand for more precise coating methods is increasing in response to these larger sized silicon substrates and liquid-crystal displays.

In order to control foamability and to obtain uniform and smooth surface finish, it is preferable for the polymer to involve an ethylenic unsaturated monomer including two or more unsaturated bonds. In addition, in this process, the photoresist patterns is developed; thus, the coated photoresist pattern must be provided with wettability with the developer.

It is advantageous to make use of the surface active agent of the present invention for solving the above subjects, because it is provided with the desired properties, such as a leveling property, low foamability, and the recoating capability.

The photoresist composition of the present invention comprises the surface active agent of the present invention and known photoresist agents. Any known photoresist agents may be used in combination with the present surface agents.

In general, the photoresist agent comprises (1) an alkali soluble resin, (2) a radiation sensitive (photosensitive) material, (3) a solvent, and when necessary, (4) other additives.

There is no particular limitation to the type of (1) the alkali-soluble resin, providing the resin is soluble in the developer which is an alkaline solution, and examples of the alkali-soluble resins include, for example, a novolac resin obtained by condensation polymerization of at least one compound selected from a group comprising, aromatic hydroxyl compounds such as phenol, cresol, xylenol, resorcinol, fluorogylcinol and hydroquinone, and novolac compounds obtained by condensation reactions of alkyl substituted or halogen substituted compounds of these aromatic hydroxyl compounds with a group of compounds consisting of formaldehyde, acetoaldehyde, benzaldehyde; polymers or copolymers of vinyl compounds including o-viylphenol, m-vinylphenol, p-vinylphenol, and α-methylvinylphenol, and their halogen substituted compounds; and a polymer or a copolymer of acrylate or methacrylate compounds including acrylic acid, methacrylic acid, and hydroxyethylmethacrylate; polyvinylalcohol; and modified resins containing various radiation sensitive groups such as a quinondiazide group, an aromatic azide group, an aromatic cinnamo oil group which are introduced in the above resins by substituting a part of their hydroxyl groups. These resins may be used alone or in combinations of two or more.

A type of urethane resin may be used as the alkali soluble resin containing acid groups such as carboxyl acid and sulfonate groups. These resins may be used alone or in combinations of two or more of the other compounds. It is to be understood that the present invention is not limited to these examples.

It is noted that any of the known radiation-sensitive materials can be used without limitation, providing that these radiation-sensitive materials does not modify the solubility of the alkaline soluble resins in the developer which is a alkaline solution, when irradiated by ultraviolet light, far ultraviolet light, excimer laser light, X-rays, electron beams, ion beams, molecular beams, or γ-rays.

The preferable radiation sensitive materials includes a quinonediazide type compound, diazo-type compounds, onium-type compound, a halogenated organic compound, a mixture of the halogenated compound and a group of organic compounds comprising an organic metal compound, an organic acid ester, an organic acid amide compound, an organic imide compound, and a polyolefinsulfone compounds disclosed in Japanese Patent Application, First Publication, No. 59-152. Examples of the quinonediazide type compound include, for example, sulfonatechlorides of qiononazide-derivatives such as 1,2-benzquinoneazide-4-sulfonatester, 1,2-naphthoquinonediazide-4-sulfonatester, 1,2-naphthoquinonediazide-5-sulfonatester, 2,1-naphthoquinonedizide-4-sulfonatester, 2,1-naphthoquinonediazide-5-sulphonatester, 1,2-naphthoquinonediazide-4-sulfonate chloride, 1,2-naphthoquinoneazide-5-sulfonatechloride, 2,1-naphthoquinonediazide-4-sulfonatechloride, and 2,1-naphthoquinonediazide-5-sulfonate chloride.

Examples of the diazo-compounds include salts as products of the condensation reaction of p-diazophenylamine and formaldehyde or acetoaaldehyde, such as hexafluorophosphate, tetraborate, inorganic salts of diazo-resins, and organic salts of diazo resins which is obtained by a reaction of the above salt products of the condensation reaction and sulfonates, as disclosed in U.S. Pat. No. 3,300,309.

Examples of azide compounds include azidechalconate, as disclosed in Japanese Patent Application, First Publication No. 58-230438, diazidebenzalmethylhexachloride, chlorohexanes and azidecinnamylideneacetophenones, and an aromatic azide or aromatic dazide compounds reported in the Journal of the Japanese Chemical Society No. 12, pp.1708–1714 (1983).

Examples of the halogenide compounds include, without any particular limitation, various known compounds, such as an oxadiazol compound containing halogen, a triazine compound containing halogen, an acetophenone compound containing halogen, a benzophenone compound containing halogen, sulfoxide compound containing halogen, sulfonic compounds containing halogen, a thiazol compound containing halogen, an oxasol compound containing halogen, a trisol compound containing halogen, 2-pyron compound containing halogen, an aliphatic hydrocarbon compound containing halogen, an aromatic hydrocarbon compound containing halogen, an aromatic hydrocarbon compound containing halogen, and heterocyclic compound containing halogen, sulfonyl-halide-type compounds, and further include, for example, tris (2,3-dibromopropyl) phosphate, tris (2,3-dibromo-3-chloropropyl) phosphate, chlorotetrabromomethane, hexachlorobenzene, bexabromobenzene, hexabromocyclodedecane, hexabromobiphenyl, trobromophenylarylether, tetrachlorobisphenol A, tetrabromobisphenol A, bis (bromoethylether) tetrabromobisphenol A, bis (bromoethylether) tetrabromobisphenol A, bis (chloroethylether) tetrachlorobisphenol A, tris (2,3-dibromopropyl) isocyanulate, 2,2-bis (4-hydroxy-3, 5-dibromophenyl) propane, 2,2-bis(4-hydroxyethoxy-3, 5-dibromophenyl) propane, which are used as the halogen-type fire resistant compounds, and the organic chlorine-type compound used for agricultural chemicals, Examples of organic acid esters include a carboxylic ester and a sulfonate ester such as carboxylate amide and sulfonate amide. Organic acid amides include amide-carboxylate and amide-sulfonate, and organic imides include imide-carboxylate and imide-sulfonate.

The ratio of the radiation-sensitive materials to be introduced in the photoresist composition is preferably in a range of 1 to 100 parts to the 100 parts of alkali soluble resin by weight, and more preferably in the range of 3 to 50 parts by weight.

In order to control solubility of the resins soluble in an alkaline solution to the developer, acid bridging compound may be added to the photoresist composition when necessary. The acid bridging compound in the present specification means a substance which forms a bridge between an acid group which is formed under irradiation by radiation and the alkali-soluble resin such that the solubility of the resin is reduced. It is preferable to select a compound containing a C—O—R group or an alkyl group in the molecule, where R represent a hydrogen atom or an alkyl group. These acid bridging compounds may be used alone or in combination of two or more. The ratio of the acid bridging compounds to be introduced in the photoresist composition is preferably in a range from 0.1 to 100 parts by weight to 100 parts by weight of the soluble resin, and more preferably in a range of 1 to 50 parts. If the ratio of the acid bridging compound is less than 0.1 parts, it becomes difficult to form the photoresist pattern, while if the ratio is more than 100, it is likely that a part of the pattern remains undeveloped.

Various known solvents may be used as the solvent (3) without any limitation. In order to improve characteristics of the resist composition for uniform coating without causing striation and for forming precise patterns by development in the photolithography process, many solvent compositions are proposed in Japanese Patent Application, First Publication, Nos. 62-36657, 4-340549, and 5-113666. It is possible, however, to avoid tedious adjustment of solvents for matching these characteristics of the composition by making use of the surface active agent of the present invention in the photoresist composition, because the use of the present surface active agent provides the composition with the ability to prevent particles from contaminating the composition, capable of thin coating without causing striation of the coat surface, capable of preventing inclusion of bubbles in the coat, and capable of developing precise resist patterns.

Recently, in order to protect the environment, it has been desired to convert the photoresist solvent compositions from the hazardous ethylcellosolve acetate to the safe ethyl lactate, which requires careful adjustments for uniform and thin coating without causing striation. Again, it is possible to eliminate such tedious adjustment by incorporating the present surface active agent in the photoresist composition. Therefore, it is possible make use of a variety of solvents for the photoresist composition, when the present surface active agent is present.

A variety of solvents to be used includes, for example, ketones such as acetone, methylethylketone, cyclohexane, cyclopentanone, cycloheptane, 2-heptanone, methylisobutylketone, and butylolactone; alcohols such as methanol, ethanol, n-propyl alcohol, iso-butyl alcohol, tert-butyl alcohol, pentanol, heptanol, octanol, nonanol, and decanol; ethers such as, ethyleneglycoldimethylether, ethyleneglycoldiethylether, and dioxane; alcohol ether such as ethyleneglycolmonomethylether, ethyleneglycolmonoethylether, ethyleneglycolmonopropylether, propyleneglycolmonomethylether, propyleneglycolmonoethylether, propyleneglycolmonopropylether, esters such as ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, methyl lactate, ethyl lactate, propyl lactate, and butyl lactate; monocarboxylic acid esters such as methyl-2-oxypropionate, ethyl-2-oxypropionate, propyl-2- oxypropionate, butyl-2-oxypropionate, propyl-2-oxypropionate, methyl-2-methoxypropionate, ethyl-2-methoxypropionate, propyl-2-methoxypropionate, and butyl-2-methoxypropionate; cellosolve esters such as cellosolve acetate, methylcellossolve acetate, ethylcellosolve acetate, propylcellosolve acetate, and butylcellosolce acetate; propyleneglycols such as propyleneglycol, propyleneglycol monomethylether, propyleneglycol monomethylether acetate, propyleneglycol monoethylether acetate, propyleneglycol monobutylether acetate; diethyleneglycols such as diethyleeneglycol monomethylether, diethyleneglycol monoethylether, diethyleneglycol dimethylether, diethyleneglycol diethylether, and diethyleneglycolmethylethylether; hydrocarbon halides such as trichloroethylene, furon, HCFC and HFC; completely fluorinated solvents such as perfluoro octane; aromatic solvents such as toluene and xylene; and polar solvents such as dimethylacetamide, dimethylformamide, N-methylacetamide, N-methylpyrrolidone. These may be used in combinations of two or more. It is to be understood that the present invention is not limited to these examples.

The ratio of the solvent in the photo-resist composition of the present invention is adjusted depending on the thickness of the coat and the coating conditions to be applied. However, in general, the weight ratio of the solvent to the total weight of the alkali-soluble resin and the radiation-sensitive materials is in a range of 10–10,000, and preferably in a range of 50–2,000.

Although the weight ratio of the surface active agent of the present invention in the photoresist composition is adjusted depending upon the thickness of the coat, coating conditions and the type of solvent selected. In general, the weight ratio of the surface active agent to 100 parts of the alkali-soluble resin is preferably in a range of 0.0001 to 5, and more preferably in a range of 0.0005 to 1.

As already described hereinbefore, the surface active agent of the present invention is an essential constituent in the photoresist composition, and the surface active agent plays a important role in reducing the dyanamic surface tension and the wettability of the coat surface, which determine the characteristics of the composition, such as the suppression of particle-generation in the composition, the capability to form thin and uniform coating without causing striation and bubbles in the coat, and the capability to form precise resist patterns by development.

It is to be understood that, besides the surface active agent of the present invention, the photo-resist composition may use, when necessary, known substances such as surface active agents, preservation agents, pigments, dyes, luminous agents, coloring agents, plasticizing agents, thickners, thixo-promoters, a suppresser of resin dissolution, and an adhesion accelerator.

It is possible to use various conventional coating methods for coating the present coating composition and the conventional coating methods comprise spin-coating, roll-coating, dip-coating, spray-coating, plate coating, curtain-coating, and gravure-coating.

Furthermore, the surface active agent of the present invention may be used for manufacturing of, for example, photosensitive goods, printing plates, liquid-crystal-display-related goods like color filter materials, PS plates, and leveling agents to be incorporated in the coating composition for producing single or multiple layered coatings in photo-fabrication. The coated products are produced without having pin-holes, rough surface finishes, and a striations, and uniform surface finishes are obtained by introducing the present surface active agent in the coating composition.

In order to provide the surface of the plastic form with properties such as being adhesion-free, low friction, high repellency of water and oil, and antifouling, the surface active agent of the present invention is applied as a surface refining agent to a group of plastic forms comprising general plastics such as polyethylene, polypropylene, polyester; thermoplastic elastomer, and engineering plastics such as PPS and PBT, without deteriorating their intrinsic properties.

The present invention will be explained in greater detail employing examples of synthesis and applications. Parts or % as used generally indicate weight standards.

SYNTHESIS EXAMPLE 1

18 parts of a methacrylate monomer with a fluorinated alkyl group (a-1), 12 parts of an ethylenic unsaturated monomer with a silicone chain (b-3-1), 58 parts of a monoacrylate compound including, as a side chain, a copolymer of ethylene oxide and propylene oxide with a molecular weight of 400, 4 parts of a tetraethyleneglycol compound, both sides of which are methacrylated, 8 parts of methylmethacrylate, and 350 parts of isopropyl alcohol (IPA) were placed in a flask equipped with a thermometer, stirrer, and circulating cooling tube. After the addition of 1 part of azobisisobutyronitrile as a polymerization initiator, and 10 parts of laurylmercaptan as a chain transfer agent, the mixture was heated to 85° C. for 7 hours in a nitrogen environment while circulating the cooling tube, to obtain a polymer.

The polystyrene converted molecular weight Mn of the polymer was 3,500. This will be designated as the surface active agent 1 hereinafter.

SYNTHESIS EXAMPLES 2 to 14

Methacrylate monomers with various fluorinated alkyl groups (A), the ethylenic unsaturated monomers with silicone chains (B), ethylenic unsaturated monomers with polyoxyethylene groups (C), ethylenic unsaturated monomers with more than two unsaturated bonds in a molecule (D), and other ethylenic unsaturated monomers (E) besides (A), B),(C), and (D), and a chain transfer agent were mixed in ratios shown in Table 1 to 4. Employing the same method as that of Example 1, polymers were obtained The molecular weights of these polymers were listed in Table 1 to 4. The ratios are shown on a weight basis, and a mixing ratio of raw materials are the same as that recited in Table 1 to 4. These polymers obtained by Synthesis Example 2–14 will be designated the surface active agent 2 to 14, respectively, hereinafter.

SYNTHESIS EXAMPLE 15

A polymer containing fluorine was obtained by using the same monomers (A), (B), and (C), except (B), the silicone chain of which was replaced with a silicone-monomethacrylate chain with a molecular weight of 1,310, and, in which, $R_2$, $R_3$, $R_4$, $R_5$, and $R_6$ in the chemical formula (1), and $R_7$, $R_8$, and $R_9$ in the chemical formula (2) were all methyl groups, and the linkage group X was—$(CH_2)_3OCO$— and p=4. The polymer was obtained by the same method as that in Example 1. The molecular weight of the polymer is shown in Table 4. This polymer will be designated as the surface active agent 15, hereinafter.

SYNTHESIS EXAMPLE 16

A polymer containing fluorine was obtained by using the same monomers (A), (B), and (C), except (B), the silicone chain of which was replaced with a silicone-monomethacrylate chain with a molecular weight of 3,800, and, in which, $R_2$, $R_3$, $R_4$, $R_5$, and $R_6$, in the chemical formula (1) were all methyl groups, and the linkage group X was —$(CH_2)_3OCO$— and P=50. The polymer was obtained by the same method as that in Example 1. The molecular weight of the polymer was shown in Table 2. This polymer will be designated as the surface active agent 16, hereinafter. The compositions for producing Synthesis Example 1 to 16 are shown in Table 1 to 4.

SYNTHESIS EXAMPLE 17

19 parts of the methacrylate monomer with a fluorinated alkyl group (a-1), 30 parts of an ethylenic unsaturated monomer with a branching aliphatic hydrocarbon group (b'-25), 39 parts of the monoacrylate compound including, as a side chain, a copolymer of ethylene oxide with a molecular weight of 400 and propylene oxide, 4 parts of a tetraethyleneglycol compound, both side of which are methacrylated, 8 parts of methacrylate, and 350 parts of IPA were placed in a flask equipped with a thermometer, stirrer, and circulating cooling tube. After the addition of 1 part of azobisisobutylonitril as a polymerization initiator, and 10 parts of laurylmercaptan as a chain transfer agent, mixture was heated to 85° C. for 7 hours in a nitrogen atmosphere under circulating the cooling tube, to obtain a polymer.

The polyester conversion molecular weight Mn of the polymer was 5,500. This will be designated as the surface active agent 17 hereinafter.

SYNTHESIS EXAMPLE 18 to 25

Methacrylate monomers with various fluorinated alkyl groups (A), ethylenic unsaturated monomers with aliphatic hydrocarbon groups having branching side chains (B'), ethylenic unsaturated monomers with polyoxyethylene groups (C), ethylenic unsaturated monomers with more than two unsaturated bonds in a molecule (D), and other ethylenic unsaturated monomers (E) besides (A), (B'),(C), and (D), and a chain transfer agent were mixed in ratios shown in Table 5 and 6. Employing the same method as that of Synthesis Example 17, polymers were obtained. The molecular weights of these polymers were listed in Table 5 and 6. The ratios are shown in weight base, and the marks of the raw materials are the same as these recited in the specification. These polymers obtained by Synthesis Example 18–25 will be designated the surface active agent 18 to 25, respectively, hereinafter. The compositions for producing Synthesis Examples 18 to 25 are shown in Table 5 and 6.

Evaluation results will be described hereinafter on test coating compositions and test samples of coated films formed by the use of four painting compositions which contain four types of paints and 0.5% by weight of the surface active agent added versus the solid resin in the coating composition under various coating conditions. The thicknesses of all coated layers were 3 µm.

Test paints and coating conditions are as follows.
(1) Normal-Curing-Type Paint

Test samples of a normal curing paint were obtained by coating Acrydic A-181 (produced by Dainippon Ink & Chemicals, Inc. Co.) on a steel plate (SPCC-SB) by a bar coater and curing for a week.
(2) Two-Liquid-Type Acrylurethane Paint Test coated samples of a two-liquid type acrylurethane paint were obtained by coating a mixture of Acrydic A-801-P and a curing agent of DN-98 (both produced by Dainippon Ink & Chemical Industries Co.) on a steel plate (SPCC-SB) by a bar-coater and curing for 20 minutes at 80° C.
(3) Baking-Type Acrylmelamine Paint Test coated samples of a glazing type acrylmelamine paint were obtained by spray coating a mixture of Acrydic A-465 and Superbeckamine L-117-60 (both produced by Dainippon Ink & Chemical Industries Co. Ltd.) on a steel plate (SPCC-SB) and curing for 30 minutes at 150° C.
(4) Baking Type Alkydmelamine Paint Test coated samples of a baking-type alkydmelamine were obtained by spray coating a mixture of Beckzol WB-703 and Superbeckamine L-117-60 (both are produced by Dainippon Ink Chemical Industries Co. Ltd.) on a steel plate (SPCC-SB) and curing at for 30 minutes at 150° C.

These test samples were, then, evaluated in terms of the following test items. The test method of each item and standards for grading will be shown hereinafter.
(A) Foamability 50 cc of a liquid paint resin was taken into a sample bottle with a air tight cap, and after vibrating the sealed bottle by an amplitude of 30 cm, and at a vibration cycle of 2 times per second for 25 seconds. The formability was graded according to the following standard.

◯: foams disappear rapidly after vibration stops

Δ: foams disappear 1 minutes after vibration stops

X: foams remain more than 1 minute after vibration stops.
(B) Leveling Property

Coated sample surfaces were visually evaluated by the following standard in terms of smoothness and crawling.

◯: very smooth without any striation and no crawling.

Δ: smooth but slightly uneven surface

X: striation and
(C) Recoating Ability 100 square sections with an area of 1 mm² were made by cutting the surface of the coated layer of test samples, and a cellotape (Registered mark) was adhered on these sections. Evaluation of the recoating ability was based on the number of sections remaining without being peeled off.

EXAMPLES 2 to 12

Coating compositions and sample coats were prepared by the same manner as Example 1, except making use of the copolymer obtained in Synthesis Example 2 to 12, and evaluation were carried out by the same method as that described in Example 1.

COMPARATIVE EXAMPLE 1

A coating composition and a coat sample were prepared in the same manner as in Example 1, except for making use of a copolymer without containing fluorine, and the same evaluation as Example 1 was carried out for the above coating composition and the sample coat.

COMPARATIVE EXAMPLES 2 to 9

Coating compositions and sample coats were prepared in the same manner as in Example 1 except for making use of copolymers obtained by Synthesis Example 13 to 16, a 50/50 by weight mixture of copolymers obtained by Synthesis Examples 13 and 14, and a commercially-available surface active agent. These compositions and sample coats were evaluated by the same method as that described in Example 1.

The above evaluation results were shown in Table 8.

Megafac F-173, F-177, and F-179 appeared in table 8 are a product of Dainippon Ink & Chemicals, Inc. and Fluorad FC-430 is a product of 3M Co.

EXAMPLE 13 to 27 and COMPARATIVE EXAMPLES 10 to 22

27 parts of a condensation product of 2,3,4-trihydroxybenzophenone and o-naphtoxydiazide-5-sulfonylchloride and 100 parts of a novolac resin which is a condensation product of cresol and formaldehyde were dissolved in 400 parts of ethyl lactate to form a solution. Additionally, the copolymers synthesized by Synthesis Examples 1 to 16, a 50/50 by weight mixture of copolymers obtained by Synthesis Example 13 and 14, or a commercially available surface active agent were further dissolved in the solution so as to attain a predetermined concentration, and the thus-formed solution was filtered by a filter made of PTFE with 0.1 micron pores to obtain photoresist compositions. A coated layer of the photoresist composition was formed on a silicon wafer with a diameter of 8 inches by spin coating at a speed of 3,000 rpm, and the silicon wafer with a photoresist film with a thickness of 1.5 microns was fabricated by drying on a hot plate for 90 seconds to remove the solvent in the coated layer. Then, thus produced silicon wafer with a photo-resist film was evaluated in terms of the items shown in Tables 9, 10, and 11.

Megafac F-173, F-177, and F-179 shown in these Tables are products of Dainippon Ink & Chemical Industries Co., and Florad FC-430 is a product of Sumitomo 3M Co. The concentrations (ppm) of copolymers with fluorine or the commercially available surface active agent are represented by a weight ratio of the solid parts of photo-resist materials in the solid parts of these copolymers or the surface active agent.

A study was made on the effect of the kind of the solvent in the photo-resist composition. That is, two kinds of new solvents were used, which are, a mixture of ethyl lactate/propyleneglycolmonomethyl ether (70/30 by weight) and a mixture of methylethylketone/2-heptanone (50/50 by weight). Any photoresist compositions composed of these solvents and copolymers synthesized in Synthesis Examples 1 to 12 and coat samples formed by these photo-resist compositions showed excellent results in all evaluated items.

In contrast, good evaluations were not obtained when the copolymer is replaced with copolymers with fluorine synthesized by Synthesis Examples 13 to 16, the 50/50 by weight mixture of Synthesis Examples 13 and 14, or the surface active agents with fluorine which were obtained commercially.

Evaluation items and methods for evaluation of Examples 13 to 27, and Comparative Examples 10 to 20 are as follows.

(D) Foamability 50 cc of a liquid photoresist composition was taken by weighing and put it into a bottle with a volume of 100 cc. The bottle was vibrated at an amplitude of 30 cm and at a cycle of 2 times per second for 25 second. Foamability was graded by the following standard.

○: foam disappears rapidly after vibration stops.

Δ: foam disappears within 1 minute after vibration stops.

X: foam do not disappear within 1 minute after vibration stops.

(E) Striation

Surfaces of sample photoresist films were observed under a microscope with the magnification of 100, and striation was graded as follows.

○: free of Striation

Δ: Striation is small

X: Striation is substantial (F) Surface Roughness

The surface roughness of the sample coats were measured by the surface roughness tester, Taristep, made by Taylor-Hobson Co. The surface roughness was measured at 21 points in one silicon wafer, and the average value was calculated.

(G) Water Repellency

As an index to the recoating ability, the contact angle of a water drop was measured just after the water drop contacted a sample coat. The contact angle was measured by an automatic contact angle tester, CA-Z, made by Kyowa Kaimen Kagaku Co.

(H) Coating Property of the Coating Composition

Coated layers of a coating composition were visually observed, and checked as to whether there were any uncoated area. The coating property is evaluated by the following standard ○: no uncoated area.

Δ: uncoated areas are extremely small.

X: uncoated areas are present including the peripheral area.

(I) Leveling Property

The static surface tension, ordinarily measured by the Wilhelmie Method, and the dynamic surface tension which is an index in the high load coating at a high speed and under a high shearing force, as suggested by the inventors of this invention, were obtained.

The static surface tension was measured by the automatic balancing surface tension tester, ESB-IV (Kyowa Kagaku Co.), which is based on the principle of the Wilhelmie Method, for a model composition of a solvent mixture of ethyl lactate and propyleneglycol-monomethylether (70/30 by weight) containing 1% by weight of the copolymer of the present invention or the commercially available surface active agent.

Dynamic surface tension was measured by an automatic dynamic surface tester, DST-A1 (Kyowa Kaimen Kagaku Co.), in which the suurface area of the solution was on average 60 $cm^2$ (varying from a maximum area of 80 $cm^2$ to a minimum area of 20 $cm^2$). The measurement was performed under a condition of a measurement cycle of 10 seconds, and at a temperature of 25° C. for a mixed solution of ethyl lactate and propyleneglycol-monomethyletheracetate, in which copolymers of the present invention or the commercially available surface active agent are dissolved that the solid portions thereof were at predetermined concentrations. The measurements were performed for 10 times for each solution, and the average value was calculated. A low dynamic surface tension is equivalent to a small surface loss energy.

EXAMPLE 28

Coating compositions adjusted by adding 0.5% by weight of the copolymer with fluorine which was synthesized in Synthesis Example 28 into four types of paints, and coated samples formed to thicknesses of 30 microns were prepared for evaluation. The four kinds of paints (normal-dry-type acryl paint, the two-liquid type acryl urethane paint, the baking type acrylmelamine paint, and the baking type alkydmelamine paint) and the coating methods are the same as described hereinbefore. Evaluation was carried out in terms of the same items (foamability, leveling and coating properties) as those described hereinbefore.

EXAMPLES 29 to 34

Coating compositions and coated samples were prepared by the method described in Example 1, except for the use of copolymers synthesized in Synthesis Example 29 to 34, and evaluations according to the same evaluation items were carried out. Evaluation results of Examples 1 to 34 are shown in Table 12.

COMPARATIVE EXAMPLE 23

A coating composition and a coated sample were prepared and evaluated along the same method as that described in Example 28, except that the composition does not include the copolymer with fluorine.

COMPARATIVE EXAMPLES 24 and 25

Coating compositions and coated samples were prepared and evaluated by the same methods described in Example 28, except the use of copolymers with fluorine synthesized by Synthesis Examples 22 and 23.

EXAMPLES 35 to 44 and COMPARATIVE EXAMPLES 26 to 29

27 parts of a condensation product of 2,3,4-trihydroxybenzophenone and o-naphtoxydiazide-5-sulfonylchloride and 100 parts of a novolac resin which is a condensation product of cresol and formaldehyde were dissolved in 400 parts of ethyl lactate to form a solution, in which 17 to 25 parts of the copolymer with fluorine was added. The solution thus formed are then filtered through a filter made of PTFE with 0.1 micron pores, to obtain a photoresist composition. Photoresist coated layers were formed on respective silicon wafers by spin coating at 3,000 rpm, and respective photoresist films with a thickness of 5 microns were obtained by drying these photoresist layers on a hot plate for 90 seconds.

In the above tables, the content of the copolymers with fluorine represent the content of the solid part of the photoresist composition.

The case was examined in which the solvent of the photo-resist composition was replaced by a mixture of ethyl lactate/propyleneglycol-monomethylether (70/30 by weight) or a mixture of methylethylketone/2-heptanone (50/50 by weight). Even if the solvent is replaced by other solvents, good results in evaluations of foamability, striation, surface roughness, leveling property, were seen when coating compositions include the present copolymers with fluorine such as these synthesized by Synthesis Examples 17 to 21 or by Synthesis Examples 24 and 25. However, for coating compositions including copolymers of Synthesis Examples 22 and 23, the properties of the compositions and the coat samples were poor.

EXAMPLE 45

In a type of paint composed of many agents as shown below, a copolymer of Synthesis Example 1 was added in a concentration of 0.1% by weight of a solid resin of an acryl-styrene emulsion-type paint (trade name Boncoat EC-888), a product of Dainippon Ink & Chemicals Inc.) to form a coating composition of the paint. Coated samples were prepared by spray coating of the coating composition by the use of a spray-gun F75-G15M (a product of Meiji Kikai Seisakusyo; nozzle caliber is 1.5 mm) under a pressure of 3.5 kg/cm$^2$. Properties of the coating composition and the coated samples were evaluated as shown hereinafter.

| Paint composition | |
|---|---|
| Composition of the paint | (parts by weight) |
| Boncoat EC-888 | 100 |
| Ethyleneglycol (anti-freeze agent) | 2.6 |
| Queen flow (dispersion agent) | 1.0 |
| Noigen EA-120 (emulsion agent) | 0.3 |
| Bestside FX (antiseptic agent) | 0.01 |
| JR-600 (titanium oxide) | 36.0 |
| SN Defoamer 121 (deforming agent) | 0.2 |
| Ammonium water solution (neutralizer) | 0.2 |
| Texanol (film-forming agent) | 7.0 |
| QP-4400 (thickener) | 9.2 |
| water | 13.8 |

Properties for Evaluation (J) Leveling Property

The leveling property of the coated samples were visually evaluated according to the following standard.

⊙: no irregularity, no cissing was observed.

○: slight irregularity was observed.

Δ: a number of irregylarities were observed.

X: a number of irregularity and cissing were observed (K) Dynamic Surface Tension The dynamic surface tension was measured by an automatic dynamic surface tester, DST-A1 (Kyowa Kaimen Kagaku Co.), in which the surface area of the solution was on average 60 cm$^2$ (varying from a maximum area of 80 cm$^2$ to a minimum area of 20 cm$^2$. The measurement was performed under conditions of a measurement cycle of 10 seconds and at a temperature of 25° C. for a mixed solution of ethyl lactate and propyleneglycol-monomethyletheracetate, in which copolymers of the present invention or the commercially available surface active agent are dissolved so that the solid portions thereof were at predetermined concentrations. The measurements were performed for 10 times for each solution, and the average value was calculated. Low dynamic surface tension is equivalent to a small surface loss energy.

EXAMPLES 46 and 47

The coating water solution and coated samples were prepared by the same method as shown in Example 4, except for the use of compounds synthesized by Synthesis Examples 46 and 47.

COMPARATIVE EXAMPLE 30

The coating water solution and coated samples were prepared by the same method shown in Example 45, except for the use of the commercially available surface active agent.

Results of evaluations for Examples 24 to 47 and Comparative Examples 16 to 30 were shown in Tables 11 to 14.

TABLE 1

| fluorine-containing polymer | (A) | (part) | (B) | (part) | (C) | (part) | chain transfer agent | (part) | polymerization initiator | (part) | solvent | (part) | molecular weight Mn |
|---|---|---|---|---|---|---|---|---|---|---|---|---|---|
| Synthesis Example 1 | 1 | a-1 | 18 | b-3-1 | 12 | copolymer (one end is acrylated) of ethylene-oxide (Mn ≈ 400) and propylene-oxide | 58 | lauryl-mer-captane | 10 | AIBN | 1 | IPA | 350 | 3,500 |
| | | | | | | tetraethyleneglycol (both ends are acrylated) | 4 | | | | | | | |
| | | | | | | methylmethacrylate | 8 | | | | | | | |
| Synthesis Example 2 | 2 | a-1 | 18 | b-3-1 | 12 | copolymer (one end is acrylated) of ethylene-oxide (Mn ≈ 400) and propylene-oxide | 58 | lauryl-mer-captane | 1 | AIBN | 0.7 | IPA | 350 | 40,000 |
| | | | | | | tetraethyleneglycol (both ends are acrylated) | 4 | | | | | | | |
| | | | | | | methylmethacrylate | 8 | | | | | | | |
| Synthesis Example 3 | 3 | a-1 | 18 | b-3-1 | 12 | copolymer (one end is acrylated) of ethylene-oxide (Mn ≈ 400) and propylene-oxide | 58 | lauryl-mer-captane | 12 | AIBN | 2 | IPA | 350 | 1,200 |
| | | | | | | tetraethyleneglycol (both ends are acrylated) | 4 | | | | | | | |
| | | | | | | methylmethacrylate | 8 | | | | | | | |
| Synthesis Example 4 | 4 | a-1 | 18 | b-3-1 | 12 | copolymer (one end is acrylated) of ethylene-oxide (Mn ≈ 400) and propylene-oxide | 58 | — | — | AIBN | 0.3 | IPA | 350 | 180,000 |
| | | | | | | tetraethyleneglycol (both ends are acrylated) | 4 | | | | | | | |
| | | | | | | methylmethacrylate | 8 | | | | | | | |

TABLE 2

| fluorine-containing polymer | (A) | (part) | (B) | (part) | (C) | (part) | chain transfer agent | (part) | polymerization initiator | (part) | solvent | (part) | molecular weight Mn |
|---|---|---|---|---|---|---|---|---|---|---|---|---|---|
| Synthesis Example 5 | 5 | a-1 | 5 | b-3-1 | 12 | copolymer (one end is acrylated) of ethylene-oxide (Mn ≈ 400) and propylene-oxide | 71 | lauryl-mer-captane | 10 | AIBN | 1 | IPA | 350 | 11,000 |
| | | | | | | tetraethyleneglycol (both ends are acrylated) | 4 | | | | | | | |
| | | | | | | methylmethacrylate | 8 | | | | | | | |
| Synthesis Example 6 | 6 | a-1 | 18 | b-1-1 | 12 | copolymer (one end is acrylated) of ethylene-oxide (Mn ≈ 400) and propylene-oxide | 58 | lauryl-mer-captane | 10 | AIBN | 1 | IPA | 350 | 3,000 |
| | | | | | | tetraethyleneglycol (both ends are acrylated) | 4 | | | | | | | |
| | | | | | | methylmethacrylate | 8 | | | | | | | |
| Synthesis Example 7 | 7 | a-1 | 18 | b-2-1 | 12 | copolymer (one end is acrylated) of ethylene-oxide (Mn ≈ 400) and propylene-oxide | 58 | lauryl-mer-captane | 10 | AIBN | 1 | IPA | 350 | 4,000 |
| | | | | | | tetraethyleneglycol (both ends are acrylated) | 4 | | | | | | | |
| | | | | | | methylmethacrylate | 8 | | | | | | | |
| Synthesis Example 8 | 8 | a-1 | 18 | b-3-4 | 12 | copolymer (one end is acrylated) of ethylene-oxide (Mn ≈ 400) and propylene-oxide | 58 | lauryl-mer-captane | 10 | AIBN | 1 | IPA | 350 | 7,000 |
| | | | | | | tetraethyleneglycol (both ends are acrylated) | 4 | | | | | | | |
| | | | | | | methylmethacrylate | 8 | | | | | | | |

TABLE 3

| fluorine-containing polymer | (A) | (part) | (B) | (part) | (C) | (part) | chain transfer agent | (part) | polymerization initiator | (part) | solvent | (part) | molecular weight Mn |
|---|---|---|---|---|---|---|---|---|---|---|---|---|---|
| Synthesis Example 9 | 9 | a-47 | 18 | b-3-1 | 12 | copolymer (one end is acrylated) of ethylene-oxide (Mn ≈ 400) and propylene-oxide | 71 | lauryl-mer-captane | 10 | AIBN | 1 | IPA | 350 | 5,000 |
| | | | | | | tetraethyleneglycol (both ends are acrylated) | 4 | | | | | | | |
| | | | | | | methylmethacrylate | 8 | | | | | | | |
| Synthesis Example 10 | 10 | a-1 | 27 | b-3-1 | 18 | tetraethyleneglycol (both ends are acrylated) | 5 | lauryl-mer-captane | 10 | AIBN | 1 | IPA | 350 | 3,500 |
| | | | | | | methylmethacrylate | 50 | | | | | | | |
| Synthesis Example 11 | 11 | a-1 | 18 | b-3-1 | 12 | copolymer (one end is acrylated) of ethylene-oxide (Mn ≈ 400) and propylene-oxide | 62 | lauryl-mer-captane | 10 | AIBN | 1 | IPA | 350 | 3,500 |
| | | | | | | methylmethacrylate | 8 | | | | | | | |
| Synthesis Example 12 | 12 | a-1 | 60 | b-3-1 | 40 | — | — | lauryl-mer-captane | 10 | AIBN | 1 | IPA | 350 | 6,000 |

TABLE 4

| fluorine-containing polymer | (A) | (part) | (B) | (part) | (C) | (part) | chain transfer agent | (part) | polymerization initiator | (part) | solvent | (part) | molecular weight Mn |
|---|---|---|---|---|---|---|---|---|---|---|---|---|---|
| Synthesis Example 13 | 13 | — | — | b-3-1 | 30 | copolymer (one end is acrylated) of ethylene-oxide (Mn ≈ 400) and propylene-oxide | 58 | lauryl-mer-captane | 10 | AIBN | 1 | IPA | 350 | 7,600 |
| | | | | | | tetraethyleneglycol (both ends are acrylated) | 4 | | | | | | | |
| | | | | | | methylmethacrylate | 8 | | | | | | | |
| Synthesis Example 14 | 14 | a-1 | 18 | — | — | copolymer (one end is acrylated) of ethylene-oxide (Mn ≈ 400) and propylene-oxide | 58 | lauryl-mer-captane | 10 | AIBN | 1 | IPA | 350 | 9,800 |
| | | | | | | tetraethyleneglycol (both ends are acrylated) | 4 | | | | | | | |
| | | | | | | methylmethacrylate | 8 | | | | | | | |
| Synthesis Example 15 | 15 | a-1 | 18 | mono-silicone-methacrylate (Mn = 1310) | 12 | copolymer (one end is acrylated) of ethylene-oxide (Mn ≈ 400) and propylene-oxide | 58 | lauryl-mer-captane | 10 | AIBN | 1 | IPA | 350 | 11,000 |
| | | | | | | tetraethyleneglycol (both ends are acrylated) | 4 | | | | | | | |
| | | | | | | methylmethacrylate | 8 | | | | | | | |
| Synthesis Example 16 | 16 | a-1 | 18 | mono-silicone-methacrylate (Mn ≈ 5000) | 12 | copolymer (one end is acrylated) of ethylene-oxide (Mn ≈ 400) and propylene-oxide | 58 | lauryl-mer-captane | 10 | AIBN | 1 | IPA | 350 | 11,000 |
| | | | | | | tetraethyleneglycol (both ends are acrylated) | 4 | | | | | | | |
| | | | | | | methylmethacrylate | 8 | | | | | | | |

TABLE 5

| fluorine-containing polymer | (A) | (part) | (B') | (part) | (C) | (part) | chain transfer agent | (part) | polymerization initiator | (part) | solvent | (part) | molecular weight Mn |
|---|---|---|---|---|---|---|---|---|---|---|---|---|---|
| Synthesis Example 17 | 17 | a-1 | 19 | b'-25 | 30 | copolymer (one end is acrylated) of ethylene-oxide (Mn ≈ 400) and propylene-oxide | 39 | lauryl-mer-captane | 10 | AIBN | 1 | IPA | 350 | 5,500 |
| | | | | | | tetraethyleneglycol (both ends are acrylated) | 4 | | | | | | | |
| | | | | | | methylmethacrylate | 8 | | | | | | | |
| Synthesis Example 18 | 18 | a-1 | 19 | b'-21 | 30 | copolymer (one end is acrylated) of ethylene- | 39 | lauryl-mer- | | | | | | 6,000 |

TABLE 5-continued

| | fluorine-containing polymer | (A) | (part) | (B') | (part) | (C) | (part) | chain transfer agent | (part) | poly-merization initiator | (part) | solvent | (part) | molecular weight Mn |
|---|---|---|---|---|---|---|---|---|---|---|---|---|---|---|
| | 18 | | | | | oxide (Mn ≈ 400) and propylene-oxide | | captane | | | | | | |
| | | | | | | tetraethyleneglycol (both ends are acrylated) | 4 | | | | | | | |
| | | | | | | methylmethacrylate | 8 | | | | | | | |
| Synthesis Example 19 | 19 | a-1 | 19 | b'-16 | 30 | copolymer (one end is acrylated) of ethylene-oxide (Mn ≈ 400) and propylene-oxide | 39 | lauryl-mer-captane | 10 | AIBN | 1 | IPA | 350 | 9,600 |
| | | | | | | tetraethyleneglycol (both ends are acrylated) | 4 | | | | | | | |
| | | | | | | methylmethacrylate | 8 | | | | | | | |
| Synthesis Example 20 | 20 | a-47 | 19 | b'-25 | 30 | acrylate with a side chain of polyethylen-oxide (Mn = 400) | 20 | lauryl-mer-captane | 10 | AIBN | 1 | IPA | 350 | 5,200 |
| | | | | | | acrylate with a side chain of polyproylene-oxide (Mn = 400) | 19 | | | | | | | |
| | | | | | | tetraethyleneglycol (both ends are acrylated) | 4 | | | | | | | |
| | | | | | | methylmethacrylate | 8 | | | | | | | |

TABLE 6

| | fluorine-containing polymer | (A) | (part) | (B') | (part) | (C) | (part) | chain transfer agent | (part) | poly-merization initiator | (part) | solvent | (part) | molecular weight Mn |
|---|---|---|---|---|---|---|---|---|---|---|---|---|---|---|
| Synthesis Example 21 | 21 | a-1 | 19 | b'-15 | 30 | copolymer (one end is acrylated) of ethylene-oxide (Mn ≈ 400) and propylene-oxide | 39 | lauryl-mer-captane | 10 | AIBN | 1 | IPA | 350 | 8,600 |
| | | | | | | tetraethyleneglycol (both ends are acrylated) | 4 | | | | | | | |
| | | | | | | methylmethacrylate | 8 | | | | | | | |
| Synthesis Example 22 | 22 | a-1 | 19 | — | — | n-stearylacrylate | 30 | lauryl-mer-captane | 10 | AIBN | 1 | IPA | 350 | 6,300 |
| | | | | | | copolymer (one end is acrylated) of ethylene-oxide (Mn ≈ 400) and propylene-oxide | 39 | | | | | | | |
| | | | | | | tetraethyleneglycol (both ends are acrylated) | 4 | | | | | | | |
| | | | | | | methylmethacrylate | 8 | | | | | | | |
| Synthesis Example 23 | 23 | — | — | b'-25 | 30 | copolymer (one end is acrylated) of ethylene-oxide (Mn ≈ 400) and | 58 | lauryl-mer-captane | 10 | AIBN | 1 | IPA | 350 | 9,800 |
| | | | | | | tetraethyleneglycol (both ends are acrylated) | 4 | | | | | | | |
| | | | | | | methylmethacrylate | 8 | | | | | | | |
| Synthesis Example 24 | 24 | a-1 | 25 | b'-25 | 40 | tetraethyleneglycol (both ends are acrylated) | 8 | lauryl-mer-captane | 10 | AIBN | 1 | IPA | 350 | 14,000 |
| | | | | | | methylmethacrylate | 27 | | | | | | | |
| Synthesis Example 25 | 25 | a-1 | 40 | b'-25 | 60 | — | — | lauryl-mer-captane | 10 | AIBN | 1 | IPA | 350 | 6,100 |

TABLE 7

| | fluorine-containing copolymer Synthesis Example | normal-dry type acryl paint | | | two-liquid type acrylurethane paint | | | baking type acrylmelamine paint | | | baking type alkidmelamine paint | | |
|---|---|---|---|---|---|---|---|---|---|---|---|---|---|
| | | defoam-ability | leveling property | recoating capability | defoam-ability | leveling property | recoating capability | defoam-ability | leveling property | recoating capability | defoam-ability | leveling property | recoating capability |
| Example 1 | 1 | ○ | ○ | 100 | ○ | ○ | 100 | ○ | ○ | 100 | ○ | ○ | 100 |
| Example 2 | 2 | ○ | ○ | 100 | ○ | ○ | 100 | ○ | ○ | 100 | ○ | ○ | 100 |
| Example 3 | 3 | ○ | Δ | 99 | ○ | Δ | 100 | ○ | ○ | 100 | ○ | ○ | 100 |
| Example 4 | 4 | Δ | Δ | 98 | Δ | Δ | 99 | Δ | Δ | 100 | Δ | Δ | 100 |
| Example 5 | 5 | ○ | Δ | 100 | ○ | Δ | 100 | ○ | ○ | 100 | ○ | ○ | 100 |

TABLE 7-continued

| | fluorine-containing copolymer | normal-dry type acryl paint | | | two-liquid type acrylurethane paint | | | baking type acrylmelamine paint | | | baking type alkidmelamine paint | | |
|---|---|---|---|---|---|---|---|---|---|---|---|---|---|
| | Synthesis Example | defoam-ability | leveling property | recoating capability | defoam-ability | leveling property | recoating capability | defoam-ability | leveling property | recoating capability | defoam-ability | leveling property | recoating capability |
| Example 6 | 6 | ○ | ○ | 100 | Δ | ○ | 100 | Δ | ○ | 100 | ○ | ○ | 100 |
| Example 7 | 7 | ○ | ○ | 100 | Δ | ○ | 100 | ○ | ○ | 100 | ○ | ○ | 100 |
| Example 8 | 8 | ○ | ○ | 100 | Δ | ○ | 100 | ○ | ○ | 100 | ○ | ○ | 100 |
| Example 9 | 9 | ○ | ○ | 100 | ○ | ○ | 100 | ○ | ○ | 100 | ○ | ○ | 100 |
| Example 10 | 10 | ○ | Δ | 97 | ○ | Δ | 100 | ○ | ○ | 100 | ○ | Δ | 95 |
| Example 11 | 11 | Δ | ○ | 100 | Δ | ○ | 100 | Δ | ○ | 99 | Δ | ○ | 96 |
| Example 12 | 12 | ○ | Δ | 94 | ○ | ○ | 97 | Δ | ○ | 99 | Δ | Δ | 96 |

TABLE 8

| | fluorine-containing copolymer | normal-dry type acryl paint | | | two-liquid type acrylurethane paint | | | baking type acrylmelamine paint | | | baking type alkidmelamine paint | | |
|---|---|---|---|---|---|---|---|---|---|---|---|---|---|
| | Synthesis Example | defoam-ability | leveling property | recoating capability | defoam-ability | leveling property | recoating capability | defoam-ability | leveling property | recoating capability | defoam-ability | leveling property | recoating capability |
| Comparative Example 1 | — | ○ | × | 100 | ○ | × | 100 | ○ | × | 100 | ○ | × | 100 |
| Comparative Example 2 | 13 | × | × | 100 | Δ | × | 100 | Δ | × | 100 | Δ | × | 100 |
| Comparative Example 3 | 14 | × | × | 100 | × | × | 100 | × | Δ | 100 | × | Δ | 100 |
| Comparative Example 4 | 15 | × | × | 94 | × | × | 85 | × | Δ | 90 | × | Δ | 89 |
| Comparative Example 5 | 16 | Δ | Δ | 51 | Δ | × | 55 | Δ | Δ | 58 | Δ | Δ | 62 |
| Comparative Example 6 | mixture of Synthesis Examples 13 and 14. | Δ | × | 88 | Δ | × | 90 | × | × | 85 | × | × | 86 |
| Comparative Example 7 | Megafac F-177 | × | × | 90 | × | × | 92 | × | × | 91 | × | Δ | 90 |
| Comparative Example 8 | Megafac F-179 | Δ | Δ | 48 | Δ | × | 52 | Δ | Δ | 61 | Δ | Δ | 64 |
| Comparative Example 9 | Fluorad FC-480 | × | Δ | 76 | × | Δ | 81 | × | Δ | 83 | × | Δ | 77 |

TABLE 9

| | fluorine-containing | | | | | | leveling property | |
|---|---|---|---|---|---|---|---|---|
| | Synthesis Example | amount of addition (ppm) | deform-ability | striation | surface roughness (Å) | water repellency (degree) | coat-ability | static surface tension (mN/m) | surface loss energy (× 10$^{-5}$ mJ) |
| Example 13 | 1 | 10 | ○ | ○ | 52 | 65 | ○ | 28.1 | 86 |
| Example 14 | 1 | 50 | ○ | ○ | 45 | 69 | ○ | 27.9 | 79 |
| Example 15 | 1 | 200 | ○ | ○ | 40 | 71 | ○ | 27.8 | 73 |
| Example 16 | 1 | 500 | ○ | ○ | 37 | 74 | ○ | 27.4 | 67 |
| Example 17 | 2 | 50 | ○ | ○ | 48 | 70 | ○ | 28.2 | 78 |
| Example 18 | 3 | 50 | ○ | Δ | 58 | 72 | Δ | 27.8 | 102 |
| Example 19 | 4 | 50 | Δ | Δ | 65 | 70 | ○ | 28.1 | 109 |
| Example 20 | 5 | 50 | ○ | Δ | 61 | 68 | Δ | 28.8 | 104 |
| Example 21 | 6 | 50 | Δ | Δ | 50 | 68 | ○ | 28.0 | 50 |
| Example 22 | 7 | 50 | Δ | ○ | 48 | 69 | ○ | 28.1 | 77 |
| Example 23 | 8 | 50 | ○ | ○ | 47 | 69 | ○ | 28.2 | 80 |
| Example 24 | 9 | 50 | ○ | ○ | 51 | 69 | ○ | 27.6 | 82 |
| Example 25 | 10 | 50 | ○ | Δ | 66 | 79 | Δ | 26.4 | 56 |
| Example 26 | 11 | 50 | Δ | ○ | 58 | 68 | ○ | 28.3 | 93 |
| Example 27 | 12 | 50 | Δ | Δ | 62 | 77 | Δ | 26.8 | 103 |

TABLE 10

| | Synthesis Example | fluorine-containing amount of addition (ppm) | deform-ability | striation | surface roughness (Å) | water repellency (degree) | coat-ability | leveling property static surface tension (mN/m) | surface loss energy (× 10⁻⁵ mJ) |
|---|---|---|---|---|---|---|---|---|---|
| Comparative Example 10 | 13 | 50 | × | × | 530 | 72 | × | 28.7 | 415 |
| Comparative Example 11 | 13 | 500 | × | × | 520 | 74 | × | 28.3 | 394 |
| Comparative Example 12 | 14 | 50 | Δ | × | 290 | 81 | Δ | 27.9 | 315 |
| Comparative Example 13 | 14 | 500 | × | Δ | 250 | 80 | Δ | 27.7 | 304 |
| Comparative Example 14 | 15 | 50 | Δ | × | 120 | 80 | × | 27.8 | 224 |
| Comparative Example 15 | 15 | 500 | Δ | × | 110 | 92 | × | 27.7 | 201 |

TABLE 11

| | Synthesis Example | fluorine-containing copolymer amount of addition (ppm) | deform-ability | striation | surface roughness (Å) | water repellency (degree) | coat-ability | leveling property static surface tension (mN/m) | surface loss energy (× 10⁻⁵ mJ) |
|---|---|---|---|---|---|---|---|---|---|
| Comparative Example 16 | 16 | 50 | Δ | × | 220 | 91 | × | 27.5 | 287 |
| Comparative Example 17 | 16 | 500 | Δ | × | 190 | 95 | × | 27.8 | 272 |
| Comparative Example 18 | mixture of Synthesis Examples 13 and 14. | 50 | × | × | 380 | 93 | Δ | 27.1 | 244 |
| Comparative Example 19 | Megafac F-173 | 50 | Δ | Δ | 360 | 82 | Δ | 27.9 | 156 |
| Comparative Example 20 | Megafac F-177 | 50 | × | × | 140 | 76 | Δ | 28.5 | 217 |
| Comparative Example 21 | Megafac F-179 | 50 | Δ | × | 130 | 83 | × | 26.5 | 150 |
| Comparative Example 22 | Florad FC-430 | 50 | × | × | 460 | 77 | × | 28.3 | 210 |

TABLE 12

| | fluorine-containing copolymer Synthesis Example | normal-dry type acryl paint | | | two-liquid type acrylurethane paint | | | baking type acrylmelamine paint | | | baking type alkidmelamine paint | | |
|---|---|---|---|---|---|---|---|---|---|---|---|---|---|
| | | defoam-ability | leveling property | recoating capability | defoam-ability | leveling property | recoating capability | defoam-ability | leveling property | recoating capability | defoam-ability | leveling property | recoating capability |
| Example 28 | 28 | ○ | ○ | 100 | ○ | ○ | 100 | ○ | ○ | 100 | ○ | ○ | 100 |
| Example 29 | 29 | ○ | ○ | 100 | ○ | ○ | 100 | ○ | ○ | 100 | ○ | ○ | 100 |
| Example 30 | 30 | ○ | ○ | 100 | ○ | Δ | 100 | ○ | ○ | 100 | ○ | Δ | 100 |
| Example 31 | 31 | ○ | ○ | 100 | ○ | ○ | 100 | ○ | ○ | 100 | ○ | ○ | 100 |
| Example 32 | 32 | Δ | Δ | 100 | Δ | Δ | 100 | ○ | ○ | 100 | ○ | ○ | 100 |
| Example 33 | 24 | ○ | ○ | 100 | ○ | Δ | 100 | ○ | Δ | 100 | ○ | Δ | 100 |
| Example 34 | 25 | ○ | Δ | 100 | Δ | Δ | 100 | ○ | Δ | 100 | ○ | Δ | 100 |
| Comparative Example 23 | — | ○ | × | 100 | ○ | × | 100 | ○ | × | 100 | ○ | × | 100 |
| Comparative Example 24 | 22 | × | ○ | 80 | × | ○ | 77 | × | ○ | 85 | × | ○ | 83 |
| Comparative Example 25 | 23 | × | × | 94 | × | × | 88 | × | Δ | 90 | × | Δ | 89 |

TABLE 13

|  | fluorine-containing copolymer | | | | | | | leveling property | |
|---|---|---|---|---|---|---|---|---|---|
|  | Synthesis Example | amount of addition (ppm) | deform-ability | striation | surface roughness (Å) | water repellency (degree) | coat-ability | static surface tension (mN/m) | surface loss energy (× 10⁻⁵ mJ) |
| Example 35 | 17 | 10 | ○ | ○ | 51 | 63 | ○ | 27.7 | 70 |
| Example 36 | 17 | 50 | ○ | ○ | 43 | 67 | ○ | 27.3 | 62 |
| Example 37 | 17 | 200 | ○ | ○ | 39 | 68 | ○ | 27.1 | 56 |
| Example 38 | 17 | 500 | ○ | ○ | 37 | 70 | ○ | 26.9 | 50 |
| Example 39 | 18 | 50 | ○ | ○ | 58 | 62 | ○ | 27.3 | 68 |
| Example 40 | 19 | 50 | ○ | ○ | 60 | 66 | Δ | 27.4 | 72 |
| Example 41 | 20 | 50 | ○ | ○ | 48 | 69 | ○ | 27.5 | 80 |
| Example 42 | 21 | 50 | Δ | Δ | 63 | 69 | Δ | 27.3 | 78 |
| Example 43 | 24 | 50 | ○ | ○ | 61 | 70 | Δ | 27.6 | 83 |
| Example 44 | 25 | 50 | ○ | ○ | 65 | 74 | Δ | 27.7 | 81 |
| Comparative Example 26 | 22 | 50 | × | × | 88 | 84 | Δ | 27.6 | 145 |
| Comparative Example 27 | 22 | 500 | × | Δ | 92 | 96 | Δ | 27.3 | 127 |
| Comparative Example 28 | 23 | 50 | × | × | 618 | 68 | × | 27.8 | 460 |
| Comparative Example 29 | 23 | 500 | × | × | 582 | 70 | × | 27.2 | 437 |

TABLE 14

|  | fluorine containing copolymer applied | leveling property | surface loss energy (× 10⁻⁵ mJ) |
|---|---|---|---|
| Example 45 | Synthesis Example 1 | ◉ | 5200 |
| Example 46 | $C_8F_{17}(CH_2CH_2O)_5H$ | ◉ | 2900 |
| Example 47 | $C_8F_{17}(CH_2CH_2O)_5COCH_2CH_2COOK$ | ◉ | 2500 |
| Comparative Example 30 | Fluorad FC-430 | Δ | 10100 |

*Fluorad FC-430 is a fluorine containing surface active agent produced by 3M Co.

What is claimed is:

1. A coating composition comprising a surface active agent containing a compound which is composed of an ethylenic unsaturated monomer having a fluorinated alkyl group and an ethylenic unsaturated monomer having a silicone chain, wherein the surface loss energy of said surface active agent dissolved in an organic solvent is less than $110 \times 10^{-5}$ mJ.

2. A coating composition according to claim 1, wherein the surface active agent comprises a compound which is composed of a copolymer composed of a copolymer polymerized by essential constituting units of an ethylenic unsaturated monomer having a fluorinated alkyl group and an ethylenic unsaturated monomer having a silicone chain, the structure of which is represented by the chemical formula (1)

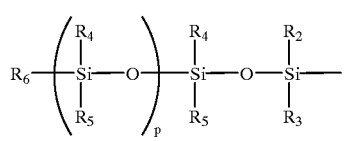

(1)

wherein $R_2$ and $R_3$, which may be the same or different, represent an alkyl group of 1 to 20 carbon atoms, a phenyl group, or a group represented by the chemical formula (2), and wherein $R_4$, $R_5$, and $R_6$, which may be the same or different, represent an alkyl group of 1 to 20 carbon atoms, or a phenyl group

(2)

wherein $R_7$, $R_8$, and $R_9$, which may be the same or different, represent an alkyl group of 1 to 20 carbon atoms or a phenyl group and p is an integer of 0 to 3.

3. A coating composition according to claim 2, wherein $R_4$, $R_5$, and $R_6$ in the chemical formula (1) are the functional groups represented by the chemical formula (2).

4. A coating composition according to claim 2, wherein both $R_2$ and $R_3$ of said silicone chain in the chemical formula (1) and $R_7$ and $R_8$ in the chemical formula (2) are all methyl groups and p=0.

5. A coating composition according to claim 1, wherein the surface active agent comprises a copolymer containing a compound which is composed of an ethylenic unsaturated monomer having a fluorinated alkyl group, an ethylenic unsaturated monomer having a silicone chain, and an ethylenic unsaturated monomer having a polyoxyalkylene monomer.

* * * * *